United States Patent
Iriyama et al.

(10) Patent No.: US 7,481,895 B2
(45) Date of Patent: Jan. 27, 2009

(54) ISOTROPIC POWDERY MAGNET MATERIAL, PROCESS FOR PREPARING AND RESIN-BONDED MAGNET

(75) Inventors: Takahiko Iriyama, Nagoya (JP); Ryo Omatsuzawa, Nagoya (JP); Takayuki Nishio, Nagoya (JP)

(73) Assignee: Daido Steel Co., Ltd., Nagoya (JP)

( * ) Notice: Subject to any disclaimer, the term of this patent is extended or adjusted under 35 U.S.C. 154(b) by 0 days.

(21) Appl. No.: 10/759,419

(22) Filed: Jan. 20, 2004

(65) Prior Publication Data
US 2004/0144450 A1 Jul. 29, 2004

Related U.S. Application Data

(63) Continuation of application No. 09/865,476, filed on May 9, 2001, now Pat. No. 6,758,918.

(30) Foreign Application Priority Data

| May 29, 2000 | (JP) | ............ 2000-158807 |
| May 30, 2000 | (JP) | ............ 2000-160514 |
| May 31, 2000 | (JP) | ............ 2000-162713 |

(51) Int. Cl.
*H01F 1/059* (2006.01)

(52) U.S. Cl. .................... 148/301; 148/101; 148/122

(58) Field of Classification Search .............. None
See application file for complete search history.

(56) References Cited

U.S. PATENT DOCUMENTS 5,395,459 A 3/1995 Pinkerton et al.
5,750,044 A 5/1998 Yoneyama et al.
5,769,969 A 6/1998 Ishikawa et al.
5,916,376 A 6/1999 Fukuno et al.
5,968,290 A 10/1999 Sakurada et al.
6,758,918 B2 * 7/2004 Iriyama et al. .............. 148/301

OTHER PUBLICATIONS

Jaswal et al., Electronic and Magnetic Structures of the Rare-Earth Compounds: R2Fe17N, Physical Review Letters, vol. 67, No. 5, Jul. 29, 1991.*
Gu et al., Electronic and Magnetic Structures of the Ternary Compound Nd2Fe17N, Physical Review B, vol. 46, No. 21, Dec. 1, 1992.*
M. Katter et al., "Structural and hard magnetic properties of rapidly solidified Sm-Fe-N," in J. Appl. Phys. 70 (6), Sep. 15, 1991.

* cited by examiner

*Primary Examiner*—Johnh P. Sheehan
(74) *Attorney, Agent, or Firm*—Posz Law Group, PLC

(57) ABSTRACT

Disclosed is an isotropic SmFeN powdery magnet material for producing resin-bonded magnets. The magnet powder is prepared by melt-spinning of a molten alloy and nitriding the alloy powder thus obtained to form a magnet alloy having an alloy composition of one of the formulae, by atomic %:

$Sm_xFe_{100-x-v}N_v$, $Sm_xFe_{100-x-y-v}M^1_yN_v$ and $Sm_xFe_{100-x-z-v}M^2_zN_v$ wherein $M^1$ is at least one member selected from the group consisting of Hf and Zr; and $M^2$ is at least one member selected from the group consisting of Si, Nb, Ti, Ga, Al, Ta and C; $7 \leq x \leq 12$, $0.1 \leq y \leq 1.5$, $0.1 \leq z \leq 1.0$ and $0.5 \leq v \leq 20$; the crystal structure is $TbCu_7$ type; and the thickness of the flakes is 10-40 μm.

18 Claims, 10 Drawing Sheets

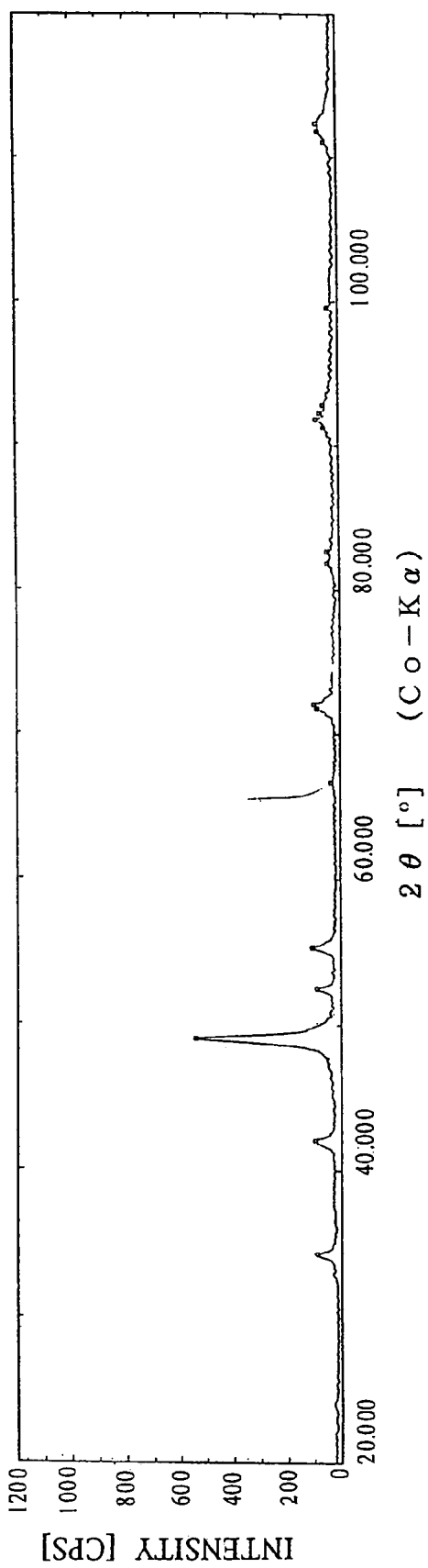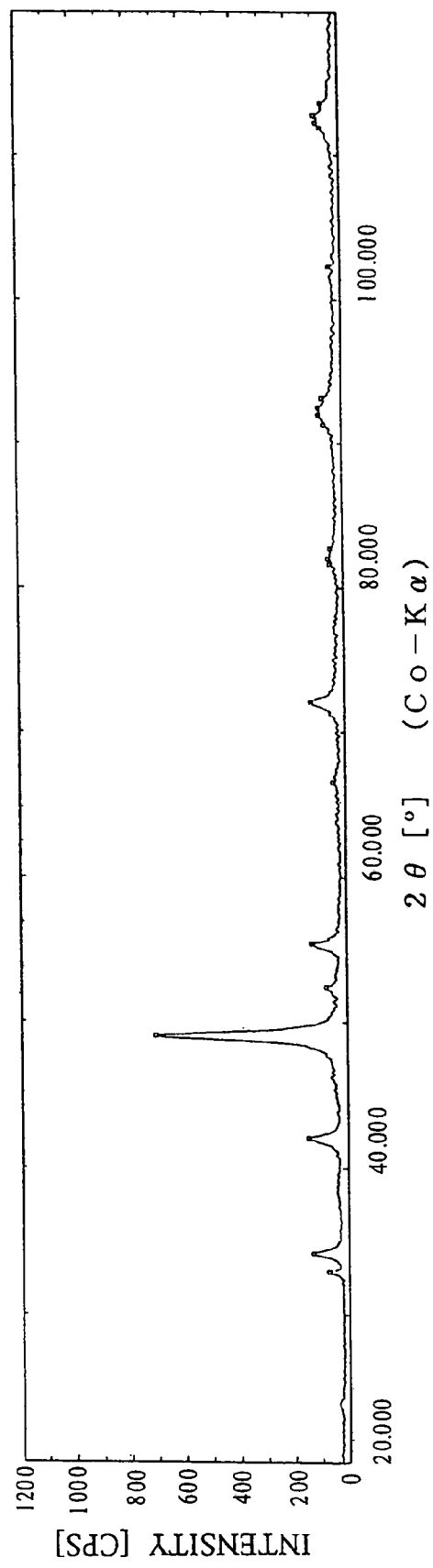

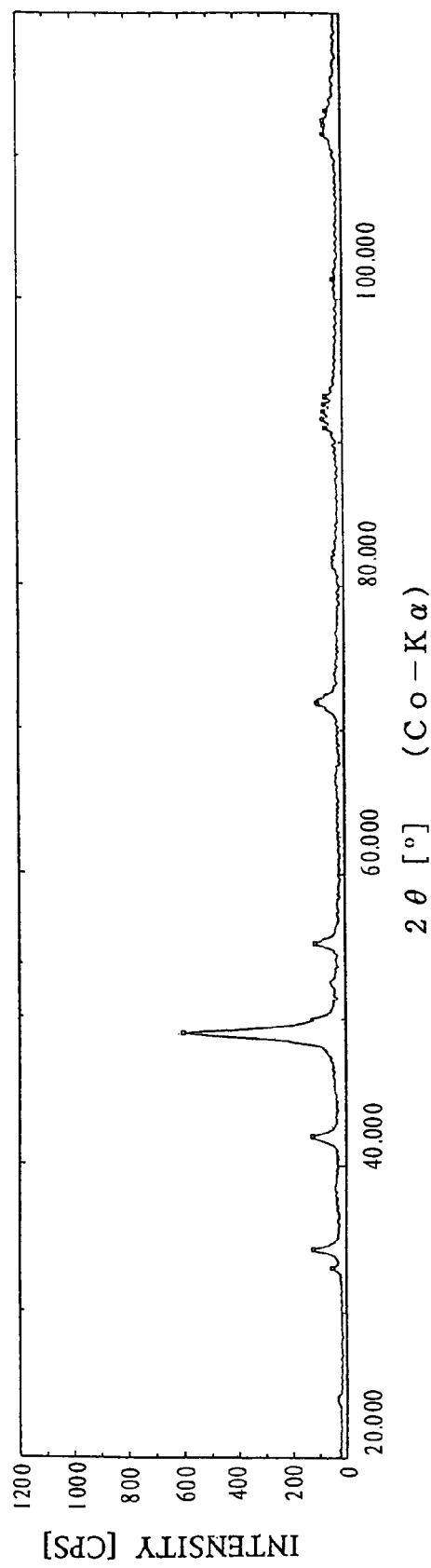
FIG.3 SmFeZrN
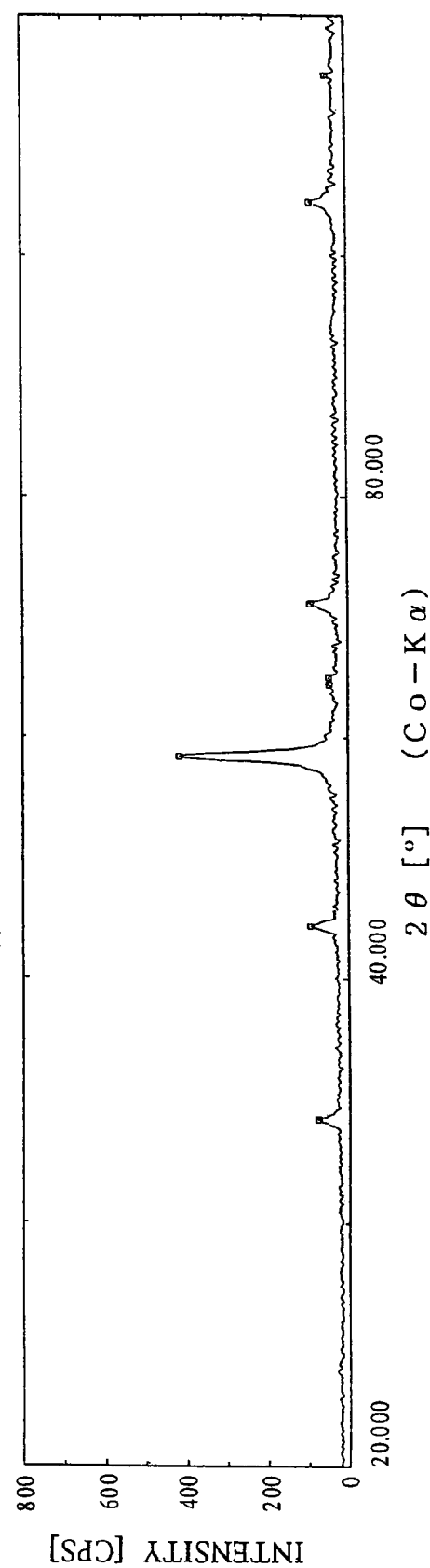
FIG.4 SmFeSiN

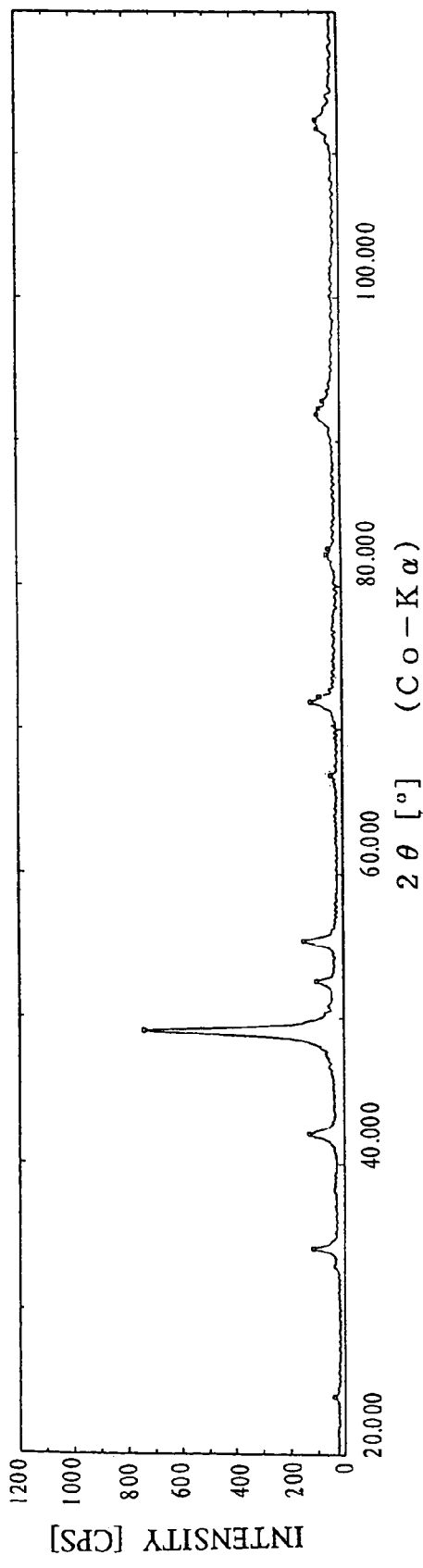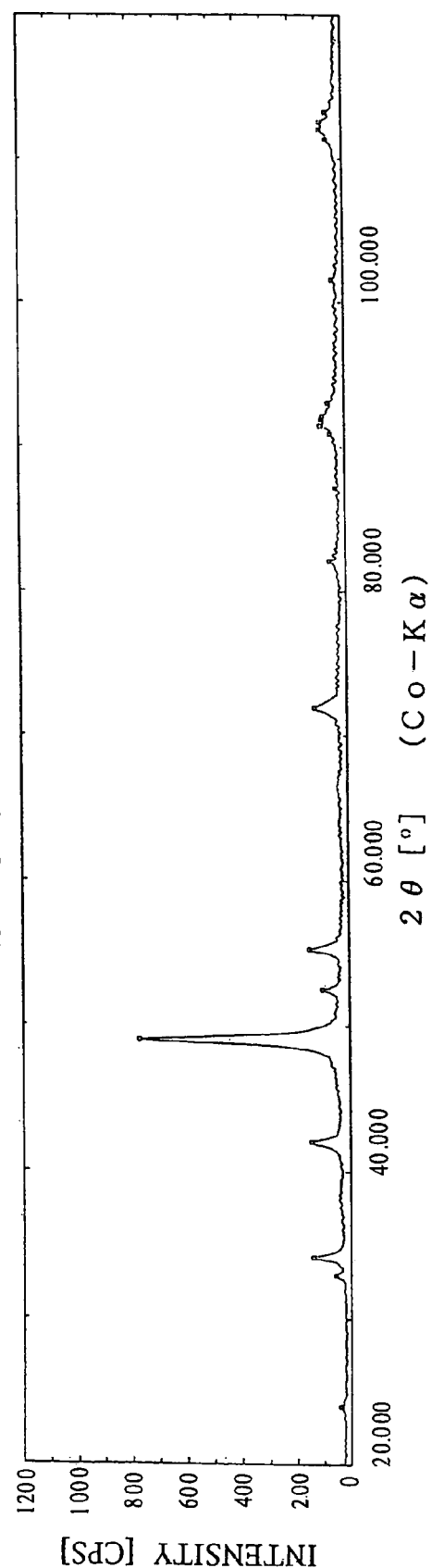

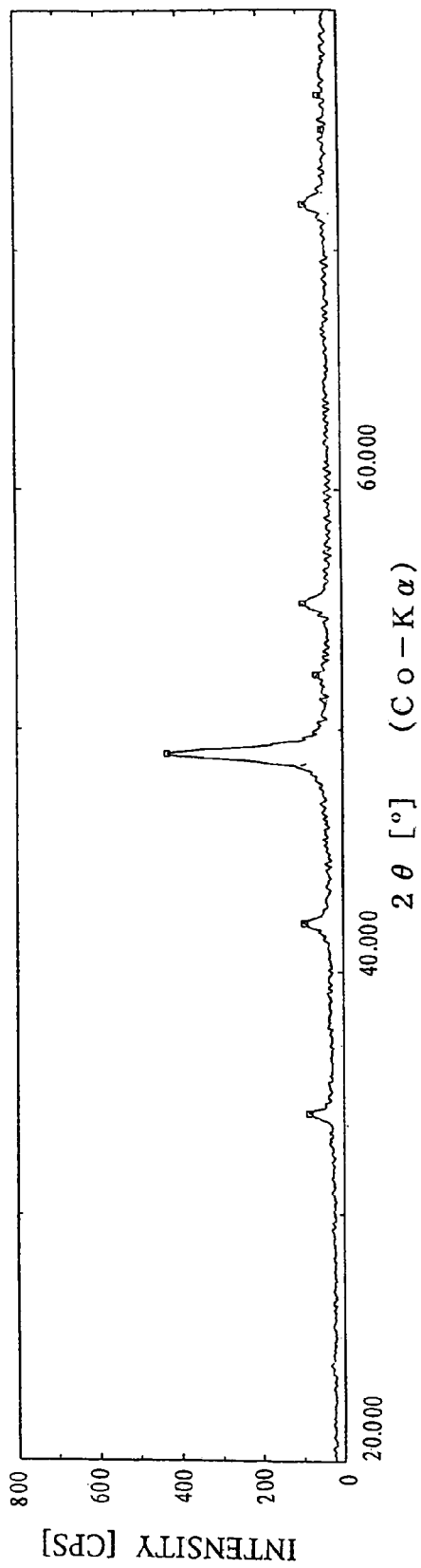
FIG.7 SmFeGaN
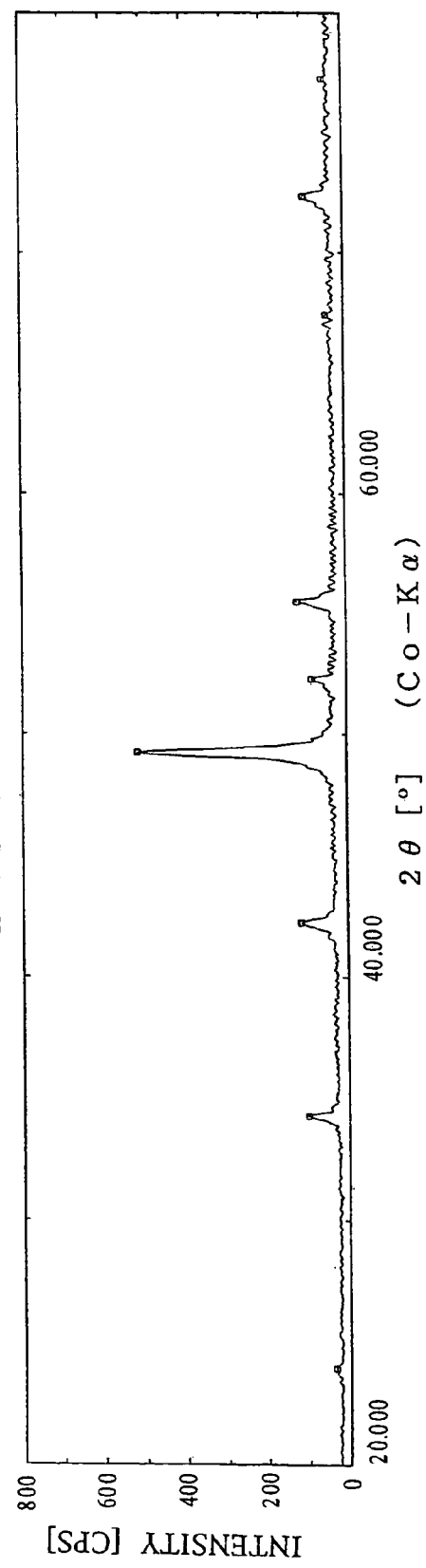
FIG.8 SmFeAlN

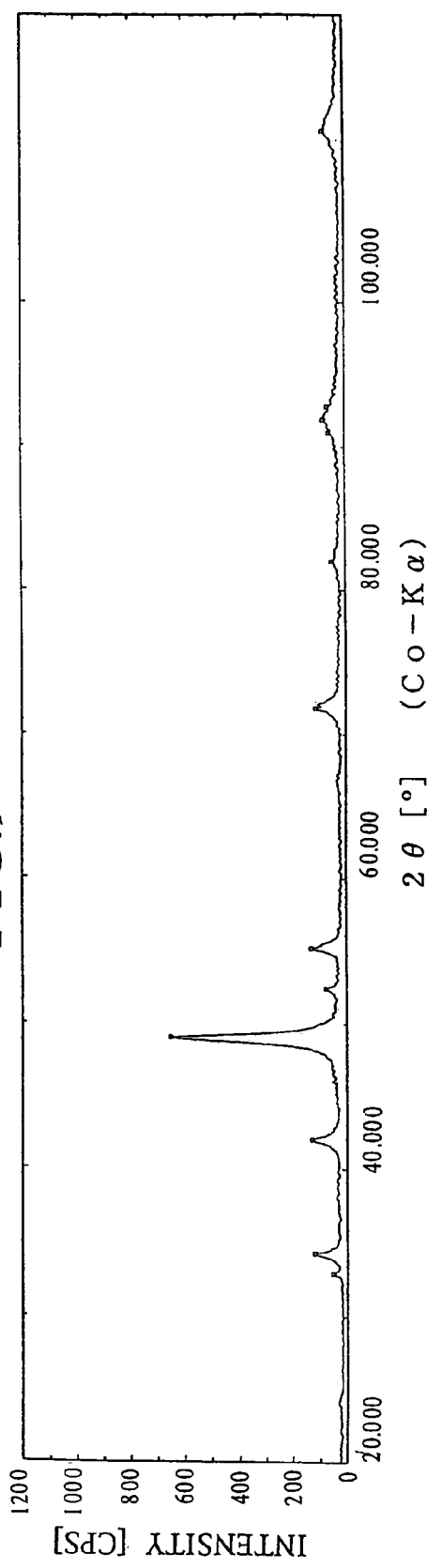
FIG.9 SmFeTaN
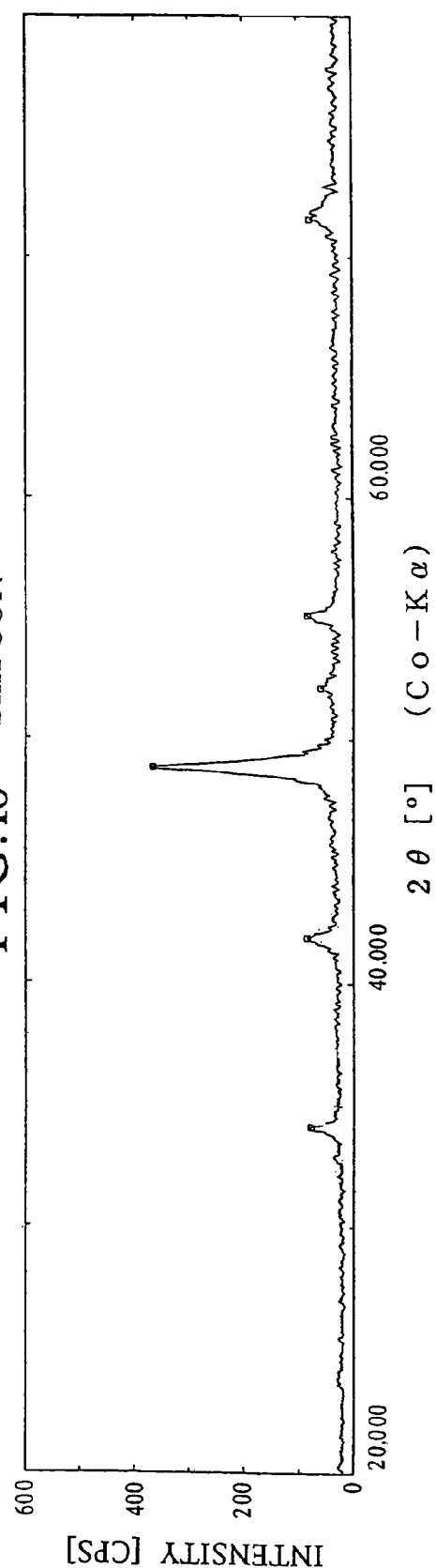
FIG.10 SmFeCN

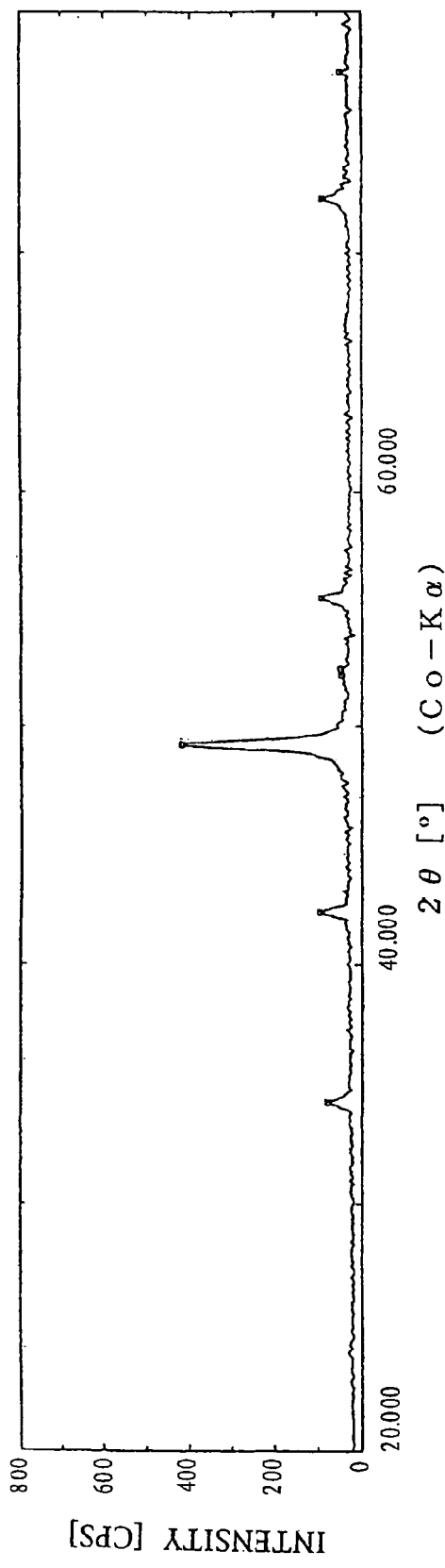
FIG. 11 SmCeFeN
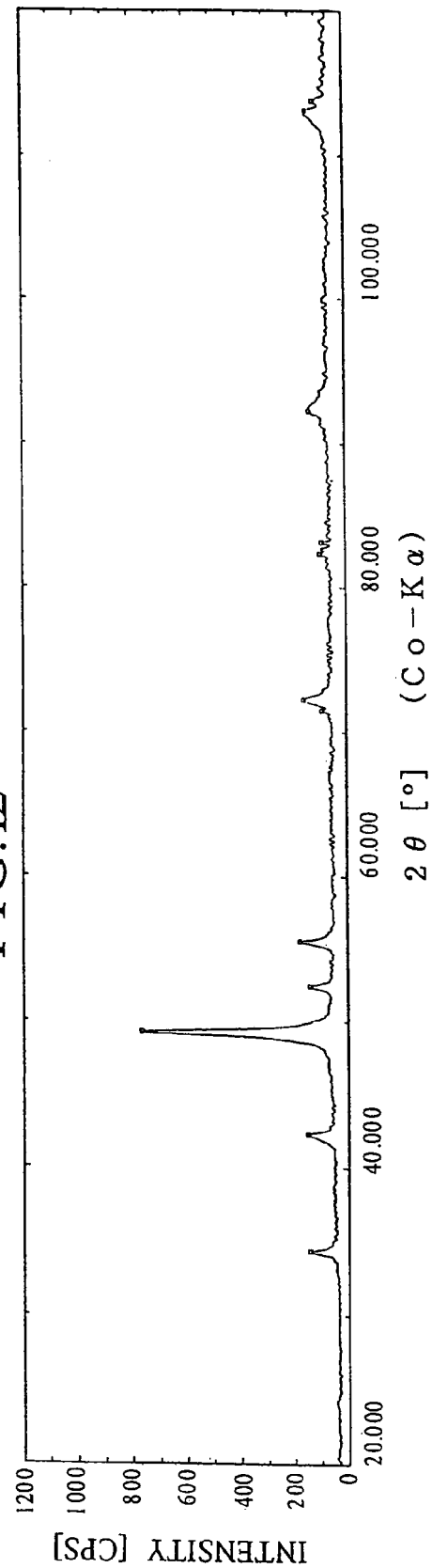
FIG. 12 SmFeCoN

ISOTROPIC POWDERY MAGNET MATERIAL, PROCESS FOR PREPARING AND RESIN-BONDED MAGNET

CROSS-REFERENCE TO RELATED APPLICATION

This application is a continuation of U.S. application Ser. No. 09/865,476, filed May 9, 2001, now U.S. Pat. No. 6,758,918. The entire disclosure of the prior application is considered as being part of the disclosure of the accompanying specification and is hereby incorporated by reference.

BACKGROUND OF THE INVENTION

The present invention concerns a permanent magnet powder having excellent magnetic properties, particularly, large maximum energy product and high coercive force, which can be provided with low costs. The invention also concerns the process for preparing the magnet powder, and the resin-bonded magnet with the magnet powder.

Rare earth metal-based isotropic bonded magnets are advantageous in that they have large maximum energy product and that they are easily processed to any desired shapes, and therefore, widely used in various electronic devices and office automation devices, particularly, for parts of small electric motors. Due to the trend of seeking higher performance and reduced sizes of the devices, further improvement in the performance of the bonded magnets used therein has been demanded.

Currently, the majority of the rare earth-based bonded magnets is isotropic bonded magnets prepared with a NdFeB-based magnet powder which is a product of so-called melt-spinning and by bonding the magnet powder with a binder resin. The maximum energy products of these magnets are, as to the compression-molded magnets, in the range of 8-12 MGOe, and as to the injection-molded magnets, in the range of 5-8 MGOe. Isotropic magnets are, though the maximum energy products are lower than those of anisotropic magnets, of high productivity, because no magnetic field is necessary to apply at the processing. Also, it is advantageous that freedom of the magnetizing patterns is high. The rare earth-based bonded magnets have been thus accepted by the market, and the major parts of the rare earth-based bonded magnets are made with isotropic magnet materials.

Recently, as a magnet material to which the same performance as, or even higher than that of NdFeB magnet alloys can be expected, SmFeN magnet alloys have been attracting public attention. For example, Japanese Patent No.2703218 and also U.S. Pat. No. 5,186,766 corresponding thereto disclose an SmFeN anisotropic magnet material having a $Th_2Zn_{17}$ type crystal structure. Because this material is anisotropic it is necessary to apply magnetic field at the processing and therefore, the process for production is more troublesome than in the case of producing the isotropic magnets.

In regard to the isotropic SmFeN magnet materials a research report was published in *J. Appl. Phys.* 70, 6 (1991), p.3188-3196. The literature reported that the crystal structures of Sm-Fe powder prepared by the melt-spinning the molten alloy and the crystal structure of SmFeN prepared by the subsequent nitriding of the powder depended on the alloy composition and the conditions of quenching, and that the crystal structure was $Th_2Zn_{17}$ type or $TbCu_7$ type.

The literature disclosed magnetic properties of the magnet powders which were prepared by quenching at peripheral speed of the quenching roll of 10 m/sec., 50 m/sec. or 60 m/sec. followed by nitriding the obtained powder. The best magnetic properties were achieved at the peripheral speed of 60 m/sec., which are as follows:

| | | |
|---|---|---|
| $Th_2Zn_{17}$ type | 16.7 kA/cm (21.0 kOe) | 65.6 kJ/m³ (8.24 MGOe) |
| $TbCu_7$ type | 4.9 kA/cm (6.2 kOe) | 69.6 kJ/m³ (8.75 MGOe) |

The latter type of crystal structure, $TbCu_7$ type, has insufficient coercive force for practical magnets. The authors said in the literature that, in order to achieve high hard magnetic properties, it is necessary to decrease the $TbCu_7$ structure to the extent as small as possible. In other words, the report suggested choice of $Th_2Zn_{17}$ type. Though this structure, $Th_2Zn_{17}$ type, gives sufficient coercive force, the maximum energy product obtained is at best 8 MGOe or so. It was thus concluded that, in view of the fact that the maximum energy product of generally used NdFeB quenched magnet powder is around 15 MGOe, the magnetic material disclosed in this report is not suitable for practical use.

Efforts for improving the performance of the SmFeN quenched magnet powder have been continued after the above report, and resulted in achieving practical magnetic properties. Examples of such publications are "*Journal of the Japan Society of Powder and Powder Metallurgy*" 46, 6 (1999) p.581-588 and the U.S. Pat. No. 5,750,044. Isotropic, bonded magnets based on SmZrFeCoN disclosed in these literatures exhibit magnetic properties better than those of the magnets with the SmFeN quenched powder described in the above literature, and the performance is near that of NdFeB bonded magnets.

However, as seen from the graphs in the above United States Patent, it is necessary to carry out such high rate quenching as the peripheral speed of quenching roll of 50-100 m/sec. This peripheral speed range is about several times of that used in the conventional production of NdFeB magnetic powder, and the quenching will at first suffer from mechanical problems. Even though such problems could be overcome, there will be caused further difficulties in production of the magnet powder itself, such as decreased yield of quenched ribbon at the quenching step or lowered quantity of powder due to insufficiently quenched powder. It is also a problem in SmZrFeCoN magnet that considerable amount of Zr, which is relatively expensive, is used.

We have conducted research to solve the above noted problems in the SmFeN magnet materials and to develop an SmFeN isotropic magnet material with reduced costs. We have discovered that employment of the producing conditions different from those of the known producing methods will eliminate use of expensive materials and necessity of extremely high rate quenching, and thus, established the powder magnet material which has advantages in industrial practice.

SUMMARY OF THE INVENTION

The object of this invention is to provide an SmFeN powder magnet material prepared by roll-quenching and subsequent nitriding of the obtained powder which gives, though quenched at not extremely high rate, the bonded magnets of excellent magnetic properties. Also, it is the object of the invention to provide a process for preparing such powder magnet material.

BRIEF EXPLANATION OF THE DRAWINGS

FIG. 1 through FIG. 12 are X-ray diffraction charts using Co—Kα raddiation of the magnet powders produced in the working examples of this invention; FIG. 1 for Example 1, Run 18; FIG. 2 for Example 2, Run 35; FIG. 3 for Example 3, Run 35; FIG. 4 for Example 4, Run 11; FIG. 5 for Example 5, Run 11; FIG. 6 for Example 6, Run 11; FIG. 7 for Example 7, Run 11; FIG. 8 for Example 8, Run 11; FIG. 9 for Example 9, Run 11; FIG. 10 for Example 10, Run 11; FIG. 11 for Example 11, Run 1; and FIG. 12 for Example 12, Run 49.

DETAILED EXPLANATION OF THE PREFERRED EMBODIMENTS

Figure 13A:
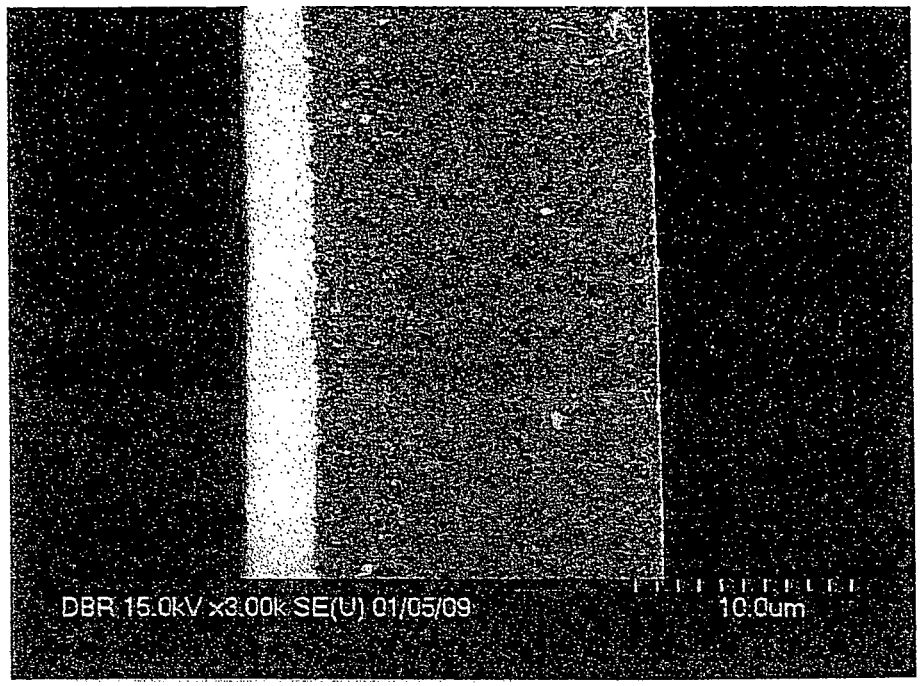
FIGS. 13A to 13D are electron microscope photos of quenched alloy prepared in Example 1, Run No.18.

The basic embodiment of the SmFeN powdery magnet material according to the invention is a flaky, isotropic SmFeN powdery magnet material prepared by roll-quenching a molten magnet alloy and by nitriding of the magnet alloy powder thus obtained, characterized in that the magnet alloy has an alloy composition of the formula, by atomic %:

$$Sm_xFe_{100-x-v}N_v$$

wherein $7 \leq x \leq 12$, and $0.5 \leq v \leq 20$, and crystal structure of $TbCu_7$ type, and that the thickness of the flakes is 10-40 μm.

A preferable embodiment of the SmFeN powdery magnet material according to the invention is a flaky, isotropic SmFeN powdery magnet material prepared by roll-quenching a molten magnet alloy and by nitriding of the magnet alloy powder thus obtained, characterized in that the magnet alloy has an alloy composition of the formula, by atomic %:

$$Sm_xFe_{100-x-y-v}M^1_yN_v$$

wherein $M^1$ is at least one member selected from the group consisting of Hf and Zr; $7 \leq x \leq 12$, $0.1 \leq y \leq 1.5$, and $0.5 \leq v \leq 20$; and crystal structure of $TbCu_7$ type; and that the thickness of the flakes is 10-40 μm.

Another embodiment of the SmFeN powdery magnet material according to the invention is a flaky, isotropic SmFeN powdery magnet material prepared by roll-quenching a molten magnet alloy and by nitriding of the magnet alloy powder thus obtained, characterized in that the magnet alloy has an alloy composition of the formula, by atomic %:

$$Sm_xFe_{100-x-z-v}M^2_zN_v$$

wherein $M^2$ is at least one member selected from the group consisting of Si, Nb, Ti, Ga, Al, Ta and C; $7 \leq x \leq 12$, $0.1 \leq z \leq 1.0 \leq z \leq 1.0$, and $0.5 \leq v \leq 20$; and crystal structure of $TbCu_7$ type; and that the thickness of the flakes is 10-40 μm.

The process for producing the above mentioned SmFeN powdery magnet material of the basic embodiment according to the invention is a process for preparing a flaky, isotropic SmFeN powdery magnet material recited above, which comprises the steps of combining and melting the alloy components to form an alloy composition of the formula, by atomic %:

$$Sm_xFe_{100-x-v}N_v$$

wherein $7 \leq x \leq 12$ and $0.5 \leq v \leq 20$; and crystal structure of $TbCu_7$ type; spilling the molten alloy on a quenching roll or rolls which rotate at a peripheral speed of 30-45 m/sec., annealing the flaky powder thus obtained in an inert atmosphere at a temperature of 500-900° C., and then nitriding the annealed powder.

The process for producing the above mentioned SmFeN powdery magnet material of the preferred embodiment according to the invention is a process for preparing a flaky, isotropic SmFeN powdery magnet material recited above, which comprises the steps of combining and melting the alloy components to form an alloy composition of the formula, by atomic %:

$$Sm_xFe_{100-x-y-v}M^1_yN_v$$

wherein $M^1$ is at least one member selected from the group consisting of Hf and Zr; $7 \leq x \leq 12$, $0.1 \leq y \leq 1.5$, and $0.5 \leq v \leq 20$; and crystal structure of $TbCu_7$ type; spilling the molten alloy on a quenching roll or rolls which rotate at a peripheral speed of 20-45 m/sec., annealing the flaky powder thus obtained in an inert atmosphere at a temperature of 500-900° C., and then nitriding the annealed powder.

The process for producing the above mentioned SmFeN powdery magnet material of another embodiment according to the invention is a process for preparing a flaky, isotropic SmFeN powdery magnet material recited above, which comprises the steps of combining and melting the alloy components to form an alloy composition of the formula, by atomic %:

$$Sm_xFe_{100-x-z-v}M^2_zN_v$$

wherein $M^2$ is at least one member selected from the group consisting of Si, Nb, Ti, Ga, Al, Ta and C; $7 \leq x \leq 12$, $0.1 \leq z \leq 1.0$, and $0.5 \leq v \leq 20$, and crystal structure of $TbCu_7$ type, spilling the molten alloy on a quenching roll or rolls which rotate at a peripheral speed of 20-45 m/sec., annealing the flaky powder thus obtained in an inert atmosphere at a temperature of 500-900° C., and then nitriding the annealed powder.

The melt-spinning of the molten alloy is carried out in argon gas atmosphere of a pressure ranging from 0.0001 Torr to 2 atms. Usually, atmospheric pressure, under which the operation is easy, can be used.

As the material of the quenching roll there has been used, with the intention to carry out the quenching at the highest rate, pure copper having the highest thermal conductivity among the practical metals. According to our experience, however, it is sometimes more suitable to use a roll made of a Cr—Cu alloy or a Be—Cu alloy. Thermal conductivities of these alloys are 50-60% of that of the pure copper. The above fact indicates that the quenching in the present invention should be carried out at, not the possible highest rate, but rather, a lower suitable rate.

The reason why the alloy composition is limited as described above is explained below.

Sm: 7-12 at. %

Sm of an amount less than 7 at. % causes formation of such a large amount of α-Fe that the coercive force of the magnet will be low. An amount larger than 12 at. % results in decrease of saturation magnetization and thus a large maximum energy product cannot be obtained.

$M^1$, i.e., One or Two of Hf and Zr: 0.1-1.5 at. %

Addition of these elements in suitable amounts improves squareness and coercive force, and increases maximum energy product of the magnet. This effect is appreciable at the addition of 0.1 at. % or higher. Too much addition will rather damages the squareness and the coercive force, resulting in the decrease of the maximum energy product. Thus, 1.5 at. % is set as the upper limit of addition.

$M^2$ Except for Carbon, i.e., One or More Selected from the Group Consisting of Si, Nb, Ga, Al, Ti and Ta: 0.1-1.0 at. %

These elements make the crystal grains fine at the quenching of the molten magnet alloy, and therefore, eliminate necessity of extremely rapid cooling. This effect can be observed at addition of 0.1 at. % or higher. From the viewpoint of magnetic properties all the members are not preferable. In order to ensure a high saturation magnetization 1.0 at. % is set as the upper limit of addition.

C: 0.1-1.0 at. %

Coexistence of carbon with "$M^1$" or "$M^2$" results in a higher saturation magnetization when compared with the case of no carbon. This effect is appreciable at a C-content of 0.1 at. % or higher. On the other hand, a C-content larger than 1.0 at. % decreases the coercive force, and as the result maximum energy product will be low.

Both in the basic and the modified alloy compositions 30 at. % or less of Sm can be substituted with Ce. This substitution improves the magnetic properties of the product magnet powder, which results in improved magnetic properties of the final products, the bonded magnets. Also, Sm can be substituted with a rare earth metal other than Ce, such as Y, Nd, Pr, La or Gd. In this case no improvement in the magnetic properties can be expected, but the requirement for the purity of the material will be lightened and the costs will become lower. The extent of substitution is limited to be also 30 at. %, and more substitution will cause significant decrease in the coercive force.

Likewise, both in the above basic alloy composition and the modified alloy compositions, 35 at. % of Fe can be substituted with Co. This substitution improves the magnetic properties of the product magnet powder, which in turn results in improved magnetic properties of the final products, the bonded magnets. Substitution of a portion of Fe with Co is favorable in increasing Curie temperatures of the magnet alloys and the increase gives heat resistance to the product magnets. However, too much addition of Co is not favorable due to decrease in saturation magnetization and increase of the costs. Practical extent of substitution is limited to be at highest 35 at. %.

The powder magnet material of this invention has the crystal structure of $TbCu_7$ and averaged crystal grain size of 10 nm to 0.5 μm. To explain these characteristic features it is necessary to discuss the requirements for the high magnetic performance in the isotropic magnet materials: high saturation magnetization of the material and high coercive force.

In order to heighten the saturation magnetization efforts should be made to increase the content of Fe in the crystal lattice of the SmFeN. It is known that there are a few crystal structure in Sm—Fe alloys, which are the material of the SmFeN magnets. The Sm—Fe alloys obtained by ordinary alloy producing process, melting and casting, are rhombohedral crystal structure of $Th_2Zn_{17}$, the equilibrium phase, in which the atomic ratio of Sm:Fe fixed to be 2:17, and therefore, Fe-content in the crystal structure is constant, 89.5 at. %.

On the other hand, as described in the above noted literature, J. Appl. Phys., 70, 6, p.3188-3196, the crystal structure of the alloys prepared by roll-quenching may be, depending on the Sm:Fe ratio and the quenching rate, not only the equilibrium phase, $Th_2Zn_{17}$, but also the hexagonal structure, $TbCu_7$. The latter is the structure resulting from random substitution of Sm-atoms in the $Th_2Zn_{17}$ structure with a pair of Fe-atoms, so-called "dumbbell Fe's". The extent of the substitution is not limited but depends on the atomic ratio of Sm and Fe. Thus, for the higher saturation magnetization $TbCu_7$ structure is preferable. Depending on the alloy compositions or conditions for preparing the alloy powder, certain amounts of phases of $Th_2Zn_{17}$, in addition to $TbCu_7$ structure, and α-Fe may occur. Unless the occurrence does not exceed 10% of the alloy powder, the influence on the magnetic properties may not be serious.

For the purpose of realizing a large coercive force it is desirable to make the crystal grains to a suitable range of fine size. In general, it is believed that, in regard to the isotropic magnet powder prepared by rapid quenching, a high coercive force will be achieved in the crystals of the size in the range of 10 nm-50 μm. One of the features of this invention is that the preferable range of the crystal size is wider than that of conventional materials, i.e., a high coercive force can be achieved in the material of our invention even though the crystal size is 5 μm at the largest. This is ten times larger than that of the conventional materials.

Thickness of the flakes of the powdery magnet material according to the invention is in the range of 10-40 μm. This thickness is given by the present process, in which the quenching is carried out without extremely rapid quenching, i.e., in detail, 30-45 m/sec. in the basic embodiment, and 20-45 m/sec. in the modified embodiments.

The powdery magnet material according to the invention can be processed to the bonded magnets by mixing the powder with a suitable resin binder and molding the mixture to desired shapes. The processing can be carried out by any method known in the technology of producing bonded magnets. Examples are: compression-molding of a mixture with a thermosetting resin such as epoxy resin, and injection-molding or extrusion-molding of a mixture with a thermoplastic resin such as nylon.

The powdery magnet materials of the present invention are obtained as the flakes, though quenched not at such a quenching rate as was compelled in the known technologies but at an easily operable, relatively low quenching rate, of fine crystal grains and of a relatively large thickness. Thus, not only the above mentioned mechanical problems at the step of the magnet powder is lightened, but also the problems in the yield of flakes and the powder quality can be fundamentally avoided, and the powder magnet materials of high magnetic properties can be always produced.

To be specifically mentioned is the excellent intrinsic coercive force. As seen in the working examples below, it is easy to achieve a coercive force of 7 kOe or higher in the magnet powder, and therefore, it is easy to produce, using the present magnet powder, the bonded magnet of an excellent coercive force as well as a high maximum energy product.

Also, it draws attention that use of the flaky powder according to the invention, which has thickness relatively thicker than the flaky powder of the conventional technologies, facilitates processing the magnet powder to the bonded magnets. When the compound of the magnet powder and the binder resin is filled into a mold for compression-molding, it is natural that the compound of the present powder can be filled with a higher filling factor when compared with the compound of the conventional powder, and results in larger density of magnet powder or better magnetic properties of the product magnet. The higher filling factor also contribute to dimentional accuracy in the bonded magnet.

In summary, the invention provides high performance, less expensive magnets and meets the requirements for further progress in the performance and miniaturization as well as decrease in the manufacturing costs.

EXAMPLES

In the following examples the process for preparing magnet powders, the conditions for annealing and nitriding, the process for producing the bonded magnets, and the measurement of magnetic properties of the magnet powders and the bonded magnets are common as described below:

[Process for Preparing Magnet Powders]

Material components of the magnet alloys were charged in a quartz vessel having a bottom nozzle of diameter 0.5 mm, and melted in argon atmosphere by induction heating. The molten alloys were spilt on a copper roll rotating at a high speed to quench the molten alloys to form quenched ribbons. The roll speeds were changed in a certain range, which are shown in the Tables. The collected ribbons were crashed by a pin-mill, and from the obtained flaky powders those passing 300 μm mesh were collected for further treatment. Thickness of the flakes was measured with a micrometer.

[Annealing and Nitriding]

The collected powders were heated in argon atmosphere to anneal. The heating conditions are, except for Examples 16 and 17, 750° C. for 10 minutes. Nitriding was carried out by putting the annealed powders in a tube furnace and by heating to 450° C. for 30 minutes under passing a mixed gas of ammonia:hydrogen=1:3 (volume ratio). The powder compositions after the nitriding are shown in the Tables together with the thickness of the flakes.

[Production of Bonded Magnets]

To the above magnet powders epoxy resin of 2 wt. % (based on the magnet powder) was added and the admixtures were processed in a compression mold under a pressure of 10 t/cm$^2$ to form columns of diameter 10 mm and height 7 mm. The processed bodies were heated in nitrogen atmosphere to 150° C. for 1 hour to cure the epoxy resin.

[Measurement of Magnetic Properties of the Magnet Powders]

Magnetic properties of the magnet powders were measured with a VSM (Vibrating Sample Magnetometer). The true density of the magnet alloys was regarded as 7.6 g/cm$^3$.

[Measurement of Magnetic Properties of the Bonded Magnets]

Magnetic properties of the bonded magnets were measured with a BH loop tracer.

Example 1

SmFeN Magnet Powders and Bonded Magnets

Figure 13B:
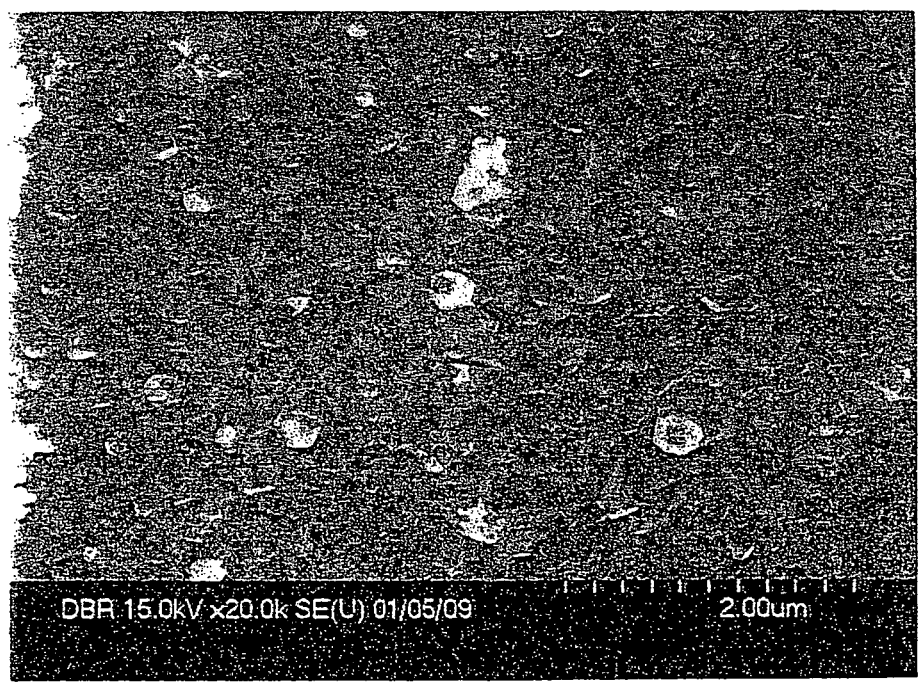
Figure 13C:
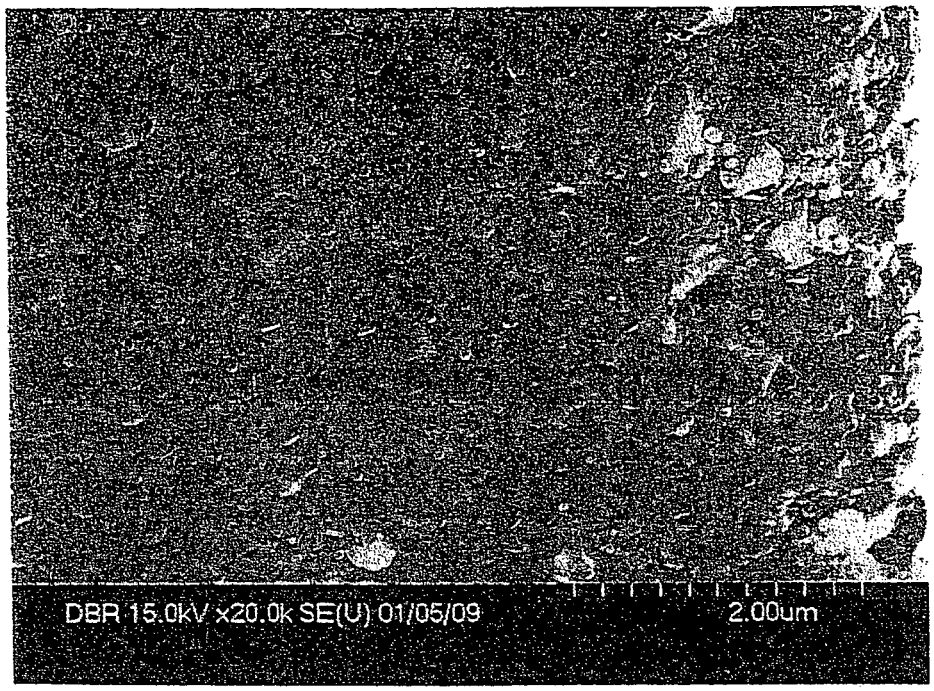
Figure 13D:
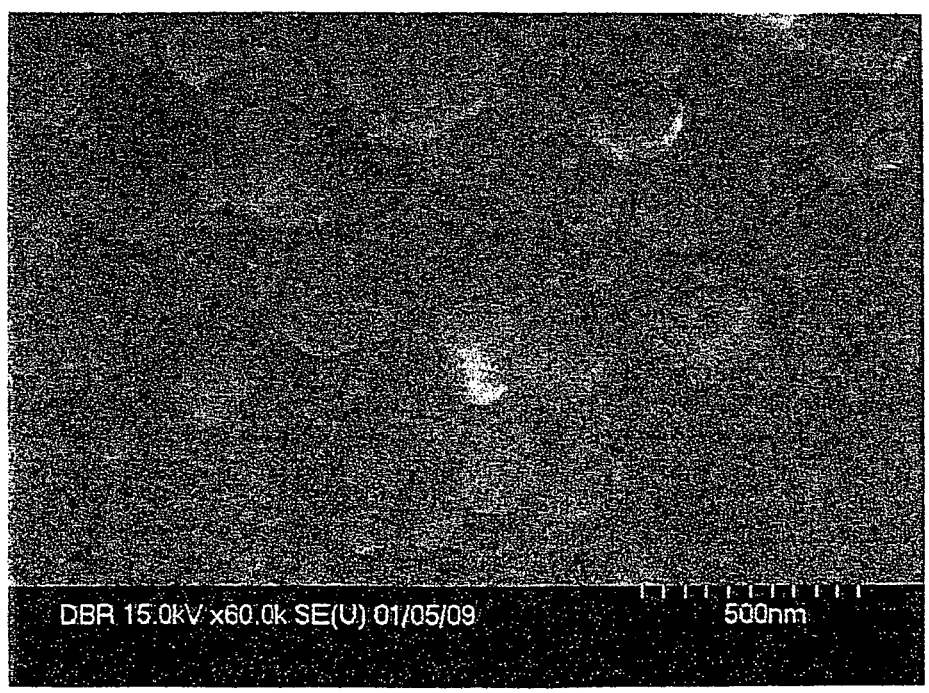

The magnetic alloys of the compositions shown in Table 1 were prepared. Peripheral speed of the quenching roll, thickness of the flaky magnet powders, magnetic properties of the magnetic powders and the bonded magnets are shown in TABLE 1. FIG. 1 shows the X-ray diffraction chart using Co-Kα radiation of the magnet powder prepared in Example 1, Run No. 18. FIGS. 13A to 13D are electron microscope photos of quenched alloy of the same Run.

In the tables "Sp" is the peripheral speed of the quenching roll, and "T", the thickness of the flakes.

TABLE 1

| | | | | SmFeN | | | | | |
|---|---|---|---|---|---|---|---|---|---|
| | | | | | Powder | | | Magnet | |
| No. | Alloy Composition | Sp m/s | T μm | Br (kG) | iHc (kOe) | (BH)max (MGOe) | Br (kG) | iHc (kOe) | (BH)max (MGOe) |
| 1 | Sm6.7Fe83.3N10.0 | 40 | 12 | 9.3 | 5.3 | 14.7 | 7.8 | 5.0 | 10.7 |
| 2 | Sm7.0Fe82.5N10.5 | 40 | 10 | 9.9 | 7.0 | 15.8 | 8.2 | 6.9 | 12.9 |
| 3 | Sm7.4Fe81.5N11.1 | 40 | 11 | 10.0 | 7.2 | 16.5 | 8.4 | 7.0 | 13.5 |
| 4 | Sm7.7Fe80.8N11.5 | 40 | 10 | 9.9 | 7.2 | 16.6 | 8.4 | 7.1 | 13.7 |
| 5 | Sm7.8Fe80.4N11.8 | 35 | 14 | 9.9 | 7.3 | 17.3 | 8.3 | 7.1 | 13.7 |
| 6 | Sm7.8Fe80.4N11.8 | 40 | 12 | 9.8 | 7.2 | 17.2 | 8.2 | 7.1 | 13.6 |
| 7 | Sm8.0Fe80.0N12.0 | 35 | 15 | 9.8 | 7.2 | 17.4 | 8.3 | 7.0 | 13.9 |
| 8 | Sm8.0Fe80.0N12.0 | 40 | 10 | 9.9 | 7.4 | 17.4 | 8.4 | 7.3 | 14.1 |
| 9 | Sm8.2Fe79.6N12.2 | 25 | 18 | 8.3 | 7.1 | 11.0 | 7.0 | 7.0 | 8.8 |
| 10 | Sm8.2Fe79.6N12.2 | 30 | 16 | 9.3 | 7.8 | 15.7 | 7.9 | 7.7 | 13.1 |
| 11 | Sm8.2Fe79.6N12.2 | 35 | 13 | 9.5 | 8.0 | 17.2 | 8.2 | 7.9 | 14.4 |
| 12 | Sm8.2Fe79.6N12.2 | 40 | 11 | 9.6 | 7.9 | 17.4 | 8.2 | 7.7 | 14.1 |
| 13 | Sm8.2Fe79.6N12.2 | 45 | 10 | 9.4 | 7.7 | 16.6 | 8.1 | 7.7 | 13.7 |
| 14 | Sm8.2Fe79.6N12.2 | 50 | 8 | 8.9 | 8.1 | 14.7 | 8.2 | 8.0 | 11.4 |
| 15 | Sm8.3Fe79.2N12.5 | 25 | 21 | 8.1 | 7.9 | 14.1 | 6.6 | 7.6 | 10.5 |
| 16 | Sm8.3Fe79.2N12.5 | 30 | 17 | 9.2 | 8.1 | 15.8 | 7.8 | 8.1 | 13.3 |
| 17 | Sm8.3Fe79.2N12.5 | 35 | 13 | 9.4 | 8.3 | 16.6 | 8.0 | 8.2 | 13.7 |
| 18 | Sm8.3Fe79.2N12.5 | 40 | 11 | 9.6 | 8.4 | 17.5 | 8.2 | 8.3 | 14.2 |
| 19 | Sm8.3Fe79.2N12.5 | 45 | 10 | 9.5 | 8.3 | 16.8 | 8.2 | 8.2 | 14.0 |
| 20 | Sm8.3Fe79.2N12.5 | 50 | 9 | 8.9 | 8.5 | 15.5 | 8.1 | 8.4 | 12.0 |
| 21 | Sm8.5Fe78.7N12.8 | 35 | 16 | 9.4 | 8.8 | 17.4 | 8.1 | 8.8 | 14.0 |
| 22 | Sm8.5Fe78.7N12.8 | 40 | 12 | 9.3 | 9.1 | 17.3 | 8.0 | 9.0 | 13.8 |
| 23 | Sm8.7Fe78.3N13.0 | 35 | 14 | 9.2 | 9.5 | 16.8 | 7.9 | 9.3 | 13.7 |
| 24 | Sm8.7Fe78.3N13.0 | 40 | 11 | 9.3 | 9.4 | 17.1 | 7.9 | 9.3 | 13.8 |
| 25 | Sm9.1Fe77.3N13.6 | 40 | 12 | 9.1 | 10.2 | 16.6 | 7.9 | 10.0 | 13.5 |
| 26 | Sm10.5Fe73.7N15.8 | 40 | 10 | 8.7 | 11.7 | 15.6 | 7.3 | 11.6 | 13.0 |

TABLE 1-continued

| | | | | SmFeN | | | | | |
| | | | | Powder | | | Magnet | | |
| No. | Alloy Composition | Sp m/s | T μm | Br (kG) | iHc (kOe) | (BH)max (MGOe) | Br (kG) | iHc (kOe) | (BH)max (MGOe) |
|---|---|---|---|---|---|---|---|---|---|
| 27 | Sm12.0Fe69.9N18.1 | 40 | 11 | 8.2 | 13.5 | 14.6 | 7.1 | 13.4 | 11.6 |
| 28 | Sm12.7Fe68.4N19.0 | 40 | 10 | 7.6 | 14.9 | 13.2 | 6.3 | 14.7 | 10.4 |

Example 2

SmFeHfN Magnet Powders and Bonded Magnets

Figure 14A:
FIGS. 14A to 14D are also electron microscope photos of quenched alloy prepared in Example 2, Run No.35. In the photos the numerals indicating length are for the distance between the two outmost short lines (of 11 lines).
Figure 14B:
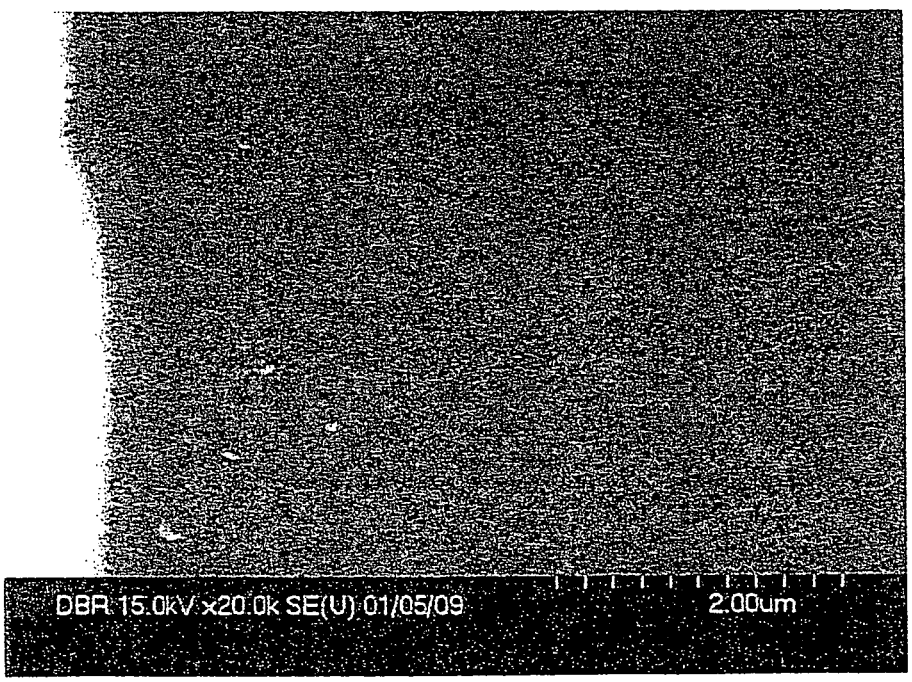
Figure 14C:
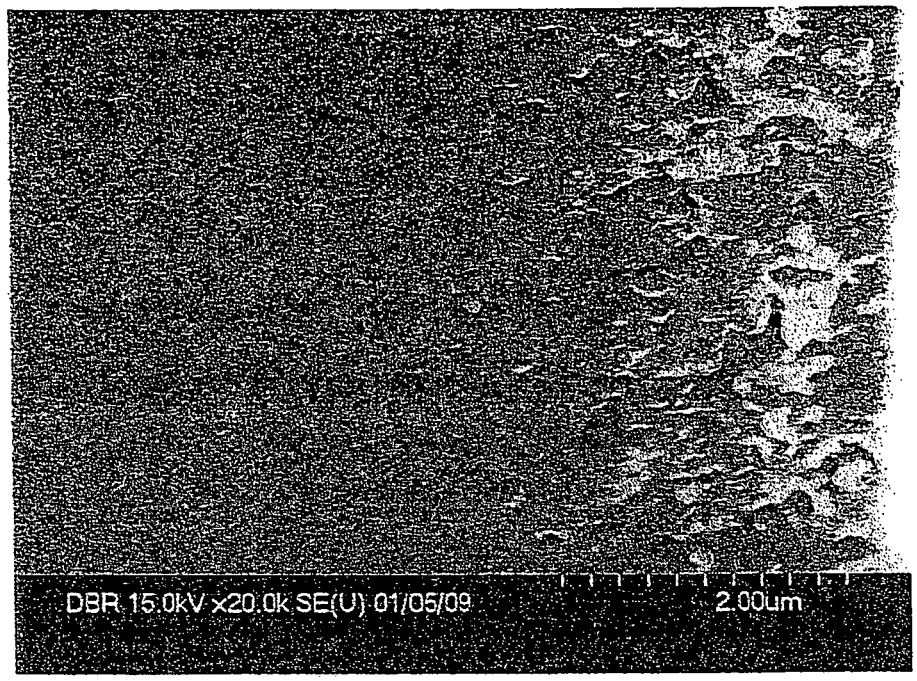
Figure 14D:
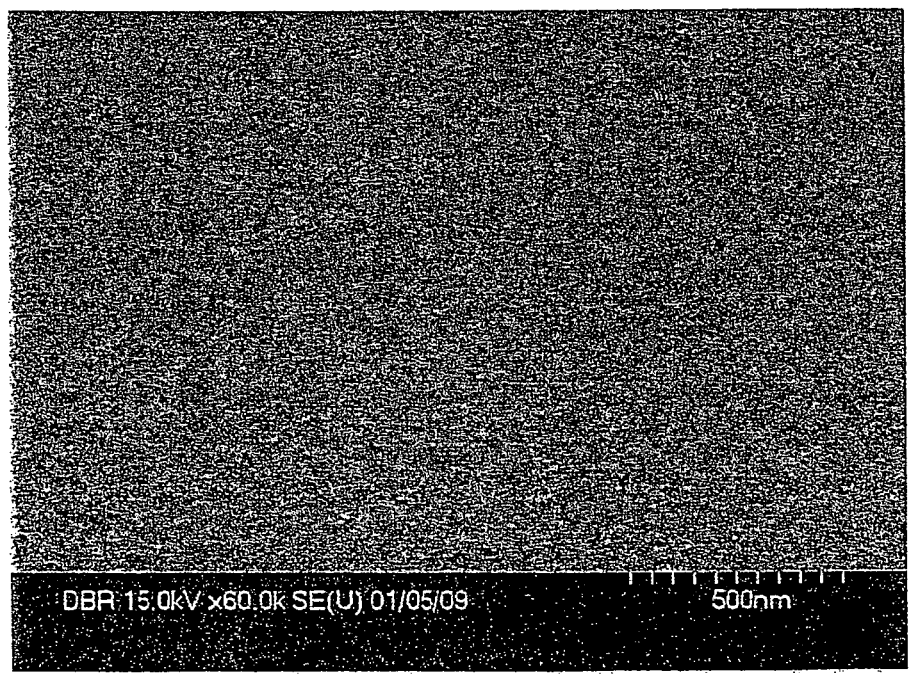

Magnet alloys of the compositions shown in TABLE 2 were prepared. Peripheral speed of the quenching roll, thickness of the flaky magnet powders, magnetic properties of the magnet powders and the bonded magnets are also shown in TABLE 2. FIG. 2 shows the X-ray diffraction chart (Co—Kα) of the magnet powder prepared in Example 2, Run No.35. FIGS. 14A to 14D are electron microscope photos of quenched alloy of the same Run.

TABLE 2

| | | | | SmFeHfN | | | | | |
| | | | | Powder | | | Magnet | | |
| No. | Alloy Composition | Sp m/s | T μm | Br (kG) | iHc (kOe) | (BH)max (MGOe) | Br (kG) | iHc (kOe) | (BH)max (MGOe) |
|---|---|---|---|---|---|---|---|---|---|
| 1 | Sm6.8Fe82.1Hf0.4N10.7 | 40 | 12 | 9.8 | 7.1 | 16.2 | 8.3 | 7.0 | 13.5 |
| 2 | Sm6.4Fe82.1Hf0.7N10.7 | 40 | 10 | 10.0 | 7.2 | 16.5 | 8.5 | 7.2 | 13.6 |
| 3 | Sm5.8Fe82.1Hf1.5N10.7 | 40 | 12 | 9.8 | 7.0 | 16.7 | 8.3 | 6.9 | 13.7 |
| 4 | Sm7.3Fe80.8Hf0.4N11.5 | 40 | 13 | 9.9 | 7.5 | 17.6 | 8.5 | 7.4 | 14.3 |
| 5 | Sm6.9Fe80.8Hf0.8N11.5 | 40 | 11 | 10.1 | 7.3 | 17.9 | 8.6 | 7.2 | 14.7 |
| 6 | Sm6.2Fe80.8Hf1.5N11.5 | 40 | 11 | 10.0 | 7.1 | 17.7 | 8.5 | 7.0 | 14.5 |
| 7 | Sm7.5Fe80.4Hf0.4N11.8 | 40 | 11 | 9.9 | 8.9 | 18.2 | 8.4 | 8.8 | 15.1 |
| 8 | Sm7.1Fe80.4Hf0.8N11.8 | 40 | 13 | 10.1 | 8.7 | 18.7 | 8.6 | 8.6 | 15.4 |
| 9 | Sm6.4Fe80.4Hf1.5N11.8 | 40 | 10 | 10.0 | 8.0 | 17.9 | 8.5 | 7.9 | 14.7 |
| 10 | Sm7.8Fe80.0Hf0.2N12.0 | 40 | 11 | 9.9 | 9.7 | 18.9 | 8.4 | 9.6 | 15.5 |
| 11 | Sm7.6Fe80.0Hf0.4N12.0 | 40 | 12 | 10.2 | 9.6 | 19.2 | 8.7 | 9.4 | 15.8 |
| 12 | Sm7.2Fe80.0Hf0.8N12.0 | 40 | 12 | 10.4 | 9.5 | 19.7 | 8.7 | 9.4 | 16.1 |
| 13 | Sm6.5Fe80.0Hf1.5N12.0 | 40 | 10 | 10.4 | 9.0 | 19.3 | 8.8 | 8.9 | 15.9 |
| 14 | Sm8.0Fe79.6Hf0.2N12.2 | 40 | 13 | 9.7 | 9.9 | 18.6 | 8.2 | 9.8 | 15.4 |
| 15 | Sm7.8Fe79.6Hf0.4N12.2 | 40 | 11 | 10.0 | 10.1 | 19.6 | 8.5 | 10.0 | 16.0 |
| 16 | Sm8.2Fe78.8Hf0.8N12.2 | 20 | 21 | 9.8 | 8.2 | 18.3 | 8.3 | 8.1 | 15.0 |
| 17 | Sm8.2Fe78.8Hf0.8N12.2 | 30 | 19 | 9.9 | 8.5 | 18.8 | 8.4 | 8.4 | 15.4 |
| 18 | Sm8.2Fe78.8Hf0.8N12.2 | 35 | 16 | 10.1 | 10.0 | 19.6 | 8.6 | 9.9 | 15.9 |
| 19 | Sm8.2Fe78.8Hf0.8N12.2 | 40 | 11 | 10.2 | 9.8 | 19.8 | 8.8 | 9.8 | 16.2 |
| 20 | Sm8.2Fe78.8Hf0.8N12.2 | 45 | 12 | 9.9 | 9.6 | 18.5 | 8.5 | 9.4 | 15.2 |
| 21 | Sm6.7Fe79.6Hf1.5N12.2 | 20 | 23 | 9.8 | 8.0 | 18.1 | 8.3 | 8.0 | 14.7 |
| 22 | Sm6.7Fe79.6Hf1.5N12.2 | 30 | 18 | 10.1 | 8.1 | 19.0 | 8.6 | 8.0 | 15.6 |
| 23 | Sm6.7Fe79.6Hf1.5N12.2 | 35 | 14 | 10.4 | 9.5 | 19.6 | 8.8 | 9.2 | 16.0 |
| 24 | Sm6.7Fe79.6Hf1.5N12.2 | 40 | 12 | 10.3 | 9.8 | 19.6 | 8.8 | 9.7 | 16.0 |
| 25 | Sm6.7Fe79.6Hf1.5N12.2 | 45 | 10 | 10.3 | 9.4 | 19.2 | 8.6 | 9.2 | 15.7 |
| 26 | Sm8.2Fe79.2Hf0.2N12.5 | 40 | 13 | 9.6 | 10.0 | 17.9 | 8.1 | 9.9 | 14.7 |
| 27 | Sm7.9Fe79.2Hf0.4N12.5 | 40 | 13 | 9.8 | 10.2 | 19.1 | 8.2 | 10.2 | 15.6 |
| 28 | Sm7.5Fe79.2Hf0.8N12.5 | 40 | 12 | 10.1 | 9.8 | 19.4 | 8.6 | 9.8 | 15.9 |
| 29 | Sm6.8Fe79.2Hf1.5N12.5 | 40 | 13 | 10.0 | 9.4 | 19.1 | 8.5 | 9.3 | 15.7 |
| 30 | Sm8.3Fe78.7Hf0.2N12.8 | 40 | 13 | 9.5 | 11.0 | 18.3 | 8.1 | 10.9 | 15.1 |
| 31 | Sm8.1Fe78.7Hf0.4N12.8 | 40 | 12 | 9.7 | 11.2 | 19.3 | 8.2 | 11.1 | 15.9 |
| 32 | Sm7.7Fe78.7Hf0.9N12.8 | 20 | 23 | 9.4 | 9.3 | 18.6 | 8.0 | 9.2 | 15.3 |
| 33 | Sm7.7Fe78.7Hf0.9N12.8 | 30 | 19 | 9.7 | 9.6 | 19.2 | 8.2 | 9.5 | 15.8 |
| 34 | Sm7.7Fe78.7Hf0.9N12.8 | 35 | 17 | 9.9 | 10.8 | 19.7 | 8.4 | 10.7 | 16.0 |
| 35 | Sm7.7Fe78.7Hf0.9N12.8 | 40 | 13 | 10.0 | 10.9 | 19.8 | 8.4 | 10.9 | 16.2 |
| 36 | Sm7.7Fe78.7Hf0.9N12.8 | 45 | 10 | 10.0 | 9.8 | 19.8 | 8.5 | 9.8 | 16.3 |
| 37 | Sm7.0Fe78.7Hf1.5N12.8 | 20 | 24 | 9.6 | 8.6 | 18.3 | 8.1 | 8.6 | 14.9 |
| 38 | Sm7.0Fe78.7Hf1.5N12.8 | 30 | 18 | 9.7 | 9.2 | 18.4 | 8.2 | 9.1 | 15.1 |
| 39 | Sm7.0Fe78.7Hf1.5N12.8 | 35 | 15 | 10.0 | 9.8 | 19.1 | 8.5 | 9.5 | 15.7 |
| 40 | Sm7.0Fe78.7Hf1.5N12.8 | 40 | 13 | 10.1 | 9.7 | 19.6 | 8.6 | 9.6 | 16.0 |
| 41 | Sm7.0Fe78.7Hf1.5N12.8 | 45 | 11 | 10.0 | 9.2 | 19.0 | 8.5 | 9.0 | 15.6 |
| 42 | Sm8.5Fe78.3Hf0.2N13.0 | 40 | 11 | 9.4 | 11.4 | 18.1 | 8.0 | 11.3 | 14.8 |
| 43 | Sm8.3Fe78.3Hf0.4N13.0 | 40 | 12 | 9.6 | 11.3 | 18.5 | 8.1 | 11.3 | 15.1 |
| 44 | Sm7.8Fe78.3Hf0.9N13.0 | 40 | 12 | 9.8 | 11.0 | 18.9 | 8.4 | 11.0 | 15.6 |
| 45 | Sm7.2Fe78.3Hf1.5N13.0 | 40 | 13 | 9.8 | 10.3 | 18.7 | 8.4 | 10.2 | 15.4 |
| 46 | Sm8.7Fe77.8Hf0.2N13.3 | 40 | 11 | 9.2 | 12.1 | 17.8 | 7.8 | 12.0 | 14.7 |
| 47 | Sm8.4Fe77.8Hf0.4N13.3 | 40 | 12 | 9.4 | 12.0 | 18.2 | 8.0 | 11.9 | 14.9 |
| 48 | Sm8.0Fe77.8Hf0.9N13.3 | 40 | 11 | 9.5 | 12.6 | 18.7 | 8.0 | 12.6 | 15.4 |

TABLE 2-continued

| | | | | SmFeHfN | | | | | |
|---|---|---|---|---|---|---|---|---|---|
| | | | | | Powder | | | Magnet | |
| No. | Alloy Composition | Sp m/s | T μm | Br (kG) | iHc (kOe) | (BH)max (MGOe) | Br (kG) | iHc (kOe) | (BH)max (MGOe) |
| 49 | Sm7.4Fe77.8Hf1.5N13.3 | 40 | 12 | 9.6 | 12.0 | 18.3 | 8.1 | 11.9 | 15.0 |
| 50 | Sm8.9Fe77.3Hf0.2N13.6 | 40 | 11 | 9.0 | 12.9 | 17.6 | 7.6 | 12.9 | 14.4 |
| 51 | Sm8.6Fe77.3Hf0.5N13.6 | 40 | 13 | 9.0 | 12.6 | 17.8 | 7.6 | 12.5 | 14.8 |
| 52 | Sm8.2Fe77.3Hf0.9N13.6 | 40 | 12 | 9.1 | 12.4 | 18.2 | 7.7 | 12.3 | 14.9 |
| 53 | Sm7.6Fe77.3Hf1.5N13.6 | 40 | 13 | 9.0 | 12.0 | 17.8 | 7.6 | 11.9 | 14.6 |
| 54 | Sm9.5Fe75.0Hf0.5N15.0 | 40 | 11 | 8.6 | 15.3 | 17.2 | 7.3 | 15.0 | 14.1 |
| 55 | Sm9.0Fe75.0Hf1.0N15.0 | 40 | 10 | 8.5 | 15.6 | 16.8 | 7.1 | 15.4 | 13.8 |
| 56 | Sm8.5Fe75.0Hf1.5N15.0 | 40 | 12 | 8.2 | 14.5 | 16.2 | 6.9 | 14.4 | 13.3 |

Example 3

SmFeZrN Magnet Powders and Bonded Magnets

Magnet alloys of the compositions shown in TABLE 3 were prepared. Peripheral speed of the quenching roll, thickness of the flaky magnet powders, magnetic properties of the magnet powders and the bonded magnets are also shown in TABLE 3. FIG. 3 shows the X-ray diffraction chart (Co—Kα) of the magnet powder prepared in Example 3, Run No.41.

TABLE 3

| | | | | SmFeZrN | | | | | |
|---|---|---|---|---|---|---|---|---|---|
| | | | | | Powder | | | Magnet | |
| No. | Alloy Composition | Sp m/s | T μm | Br (kG) | iHc (kOe) | (BH)max (MGOe) | Br (kG) | iHc (kOe) | (BH)max (MGOe) |
| 1 | Sm6.8Fe82.1Zr0.4N10.7 | 40 | 11 | 9.7 | 7.2 | 15.9 | 8.2 | 7.1 | 13.1 |
| 2 | Sm6.4Fe82.1Zr0.7N10.7 | 40 | 11 | 9.9 | 7.3 | 16.5 | 8.4 | 7.3 | 13.4 |
| 3 | Sm5.6Fe82.1Zr1.5N10.7 | 40 | 13 | 9.8 | 7.0 | 16.6 | 8.3 | 6.9 | 13.5 |
| 4 | Sm7.3Fe80.8Zr0.4N11.5 | 40 | 12 | 10.0 | 7.6 | 17.5 | 8.6 | 7.5 | 14.0 |
| 5 | Sm6.9Fe80.8Zr0.8N11.5 | 40 | 12 | 10.1 | 7.5 | 18.0 | 8.6 | 7.4 | 14.6 |
| 6 | Sm6.2Fe80.8Zr1.5N11.5 | 40 | 10 | 9.9 | 7.1 | 17.6 | 8.4 | 7.0 | 14.3 |
| 7 | Sm7.5Fe80.4Zr0.4N11.8 | 40 | 10 | 9.9 | 8.7 | 18.2 | 8.4 | 8.6 | 15.0 |
| 8 | Sm7.1Fe80.4Zr0.8N11.8 | 40 | 13 | 10.0 | 8.5 | 18.6 | 8.5 | 8.4 | 15.1 |
| 9 | Sm6.4Fe80.4Zr1.5N11.8 | 40 | 11 | 9.9 | 8.0 | 18.1 | 8.4 | 7.9 | 14.7 |
| 10 | Sm7.8Fe80.0Zr0.2N12.0 | 40 | 12 | 10.0 | 9.4 | 19.0 | 8.5 | 9.3 | 15.5 |
| 11 | Sm7.6Fe80.0Zr0.4N12.0 | 40 | 12 | 10.1 | 9.3 | 19.3 | 8.6 | 9.1 | 15.7 |
| 12 | Sm7.2Fe80.0Zr0.8N12.0 | 40 | 13 | 10.2 | 9.1 | 19.6 | 8.6 | 9.0 | 15.9 |
| 13 | Sm6.5Fe80.0Zr1.5N12.0 | 40 | 12 | 10.2 | 9.0 | 19.3 | 8.7 | 8.9 | 15.7 |
| 14 | Sm8.0Fe79.6Zr0.2N12.2 | 40 | 11 | 9.8 | 9.4 | 18.5 | 8.3 | 9.3 | 15.1 |
| 15 | Sm7.8Fe79.6Zr0.4N12.2 | 40 | 11 | 10.0 | 9.9 | 19.3 | 8.5 | 9.8 | 15.7 |
| 16 | Sm8.2Fe78.8Zr0.8N12.2 | 20 | 20 | 9.7 | 8.2 | 17.9 | 8.2 | 8.1 | 14.5 |
| 17 | Sm8.2Fe78.8Zr0.8N12.2 | 30 | 18 | 10.0 | 8.5 | 18.9 | 8.5 | 8.4 | 15.4 |
| 18 | Sm8.2Fe78.8Zr0.8N12.2 | 35 | 16 | 10.2 | 9.7 | 19.1 | 8.7 | 9.6 | 15.4 |
| 19 | Sm8.2Fe78.8Zr0.8N12.2 | 40 | 12 | 10.3 | 9.6 | 19.7 | 8.9 | 9.6 | 16.0 |
| 20 | Sm8.2Fe78.8Zr0.8N12.2 | 45 | 10 | 10.3 | 9.3 | 19.6 | 8.8 | 9.1 | 15.9 |
| 21 | Sm6.7Fe79.6Zr1.5N12.2 | 20 | 23 | 9.6 | 8.0 | 17.7 | 8.1 | 8.0 | 14.3 |
| 22 | Sm6.7Fe79.6Zr1.5N12.2 | 30 | 17 | 10.0 | 8.1 | 18.5 | 8.5 | 8.0 | 15.0 |
| 23 | Sm6.7Fe79.6Zr1.5N12.2 | 35 | 15 | 10.3 | 9.3 | 19.4 | 8.8 | 9.0 | 15.8 |
| 24 | Sm6.7Fe79.6Zr1.5N12.2 | 40 | 11 | 10.5 | 9.5 | 19.8 | 8.9 | 9.4 | 16.0 |
| 25 | Sm6.7Fe79.6Zr1.5N12.2 | 45 | 10 | 10.4 | 9.7 | 19.6 | 8.8 | 9.5 | 15.9 |
| 26 | Sm8.2Fe79.2Zr0.2N12.5 | 40 | 12 | 9.6 | 9.8 | 18.1 | 8.1 | 9.7 | 14.7 |
| 27 | Sm7.9Fe79.2Zr0.4N12.5 | 40 | 11 | 9.9 | 10.0 | 19.0 | 8.3 | 10.0 | 15.4 |
| 28 | Sm7.5Fe79.2Zr0.8N12.5 | 40 | 11 | 10.2 | 9.5 | 19.7 | 8.7 | 9.5 | 16.0 |
| 29 | Sm6.8Fe79.2Zr1.5N12.5 | 40 | 12 | 10.2 | 9.3 | 19.3 | 8.7 | 9.2 | 15.7 |
| 30 | Sm8.3Fe78.7Zr0.2N12.8 | 40 | 11 | 9.5 | 11.1 | 18.4 | 8.1 | 11.0 | 15.0 |
| 31 | Sm8.1Fe78.7Zr0.4N12.8 | 40 | 12 | 9.9 | 11.0 | 19.7 | 8.4 | 10.9 | 16.0 |
| 32 | Sm7.7Fe78.7Zr0.9N12.8 | 20 | 21 | 9.4 | 9.3 | 18.1 | 8.0 | 9.2 | 14.7 |
| 33 | Sm7.7Fe78.7Zr0.9N12.8 | 30 | 19 | 9.6 | 9.4 | 18.6 | 8.1 | 9.3 | 15.1 |
| 34 | Sm7.7Fe78.7Zr0.9N12.8 | 35 | 15 | 9.9 | 10.5 | 19.4 | 8.4 | 10.4 | 15.7 |
| 35 | Sm7.7Fe78.7Zr0.9N12.8 | 40 | 11 | 10.1 | 10.2 | 19.8 | 8.5 | 10.2 | 16.0 |
| 36 | Sm7.7Fe78.7Zr0.9N12.8 | 45 | 10 | 10.0 | 10.6 | 19.7 | 8.5 | 10.6 | 16.1 |
| 37 | Sm7.0Fe78.7Zr1.5N12.8 | 20 | 24 | 9.5 | 8.6 | 17.4 | 8.1 | 8.6 | 14.0 |

TABLE 3-continued

SmFeZrN

| No. | Alloy Composition | Sp m/s | T μm | Powder Br (kG) | iHc (kOe) | (BH)max (MGOe) | Magnet Br (kG) | iHc (kOe) | (BH)max (MGOe) |
|---|---|---|---|---|---|---|---|---|---|
| 38 | Sm7.0Fe78.7Zr1.5N12.8 | 30 | 17 | 9.8 | 9.0 | 18.0 | 8.3 | 8.9 | 14.6 |
| 39 | Sm7.0Fe78.7Zr1.5N12.8 | 35 | 14 | 10.1 | 9.5 | 19.1 | 8.6 | 9.2 | 15.5 |
| 40 | Sm7.0Fe78.7Zr1.5N12.8 | 40 | 12 | 10.1 | 9.7 | 19.2 | 8.6 | 9.6 | 15.6 |
| 41 | Sm7.0Fe78.7Zr1.5N12.8 | 45 | 10 | 10.0 | 9.7 | 19.0 | 8.5 | 9.5 | 15.5 |
| 42 | Sm8.5Fe78.3Zr0.2N13.0 | 40 | 12 | 9.4 | 11.2 | 17.9 | 8.0 | 11.1 | 14.5 |
| 43 | Sm8.3Fe78.3Zr0.4N13.0 | 40 | 11 | 9.6 | 11.0 | 18.6 | 8.1 | 11.0 | 15.0 |
| 44 | Sm7.8Fe78.3Zr0.9N13.0 | 40 | 11 | 9.7 | 10.6 | 18.9 | 8.3 | 10.6 | 15.5 |
| 45 | Sm7.2Fe78.3Zr1.5N13.0 | 40 | 11 | 9.7 | 10.1 | 18.3 | 8.3 | 10.0 | 14.9 |
| 46 | Sm8.7Fe77.8Zr0.2N13.3 | 40 | 10 | 9.2 | 11.9 | 17.9 | 7.8 | 11.8 | 14.6 |
| 47 | Sm8.4Fe77.8Zr0.4N13.3 | 40 | 11 | 9.4 | 12.4 | 18.3 | 8.0 | 12.3 | 14.9 |
| 48 | Sm8.0Fe77.8Zr0.9N13.3 | 40 | 11 | 9.5 | 12.0 | 18.9 | 8.0 | 12.0 | 15.4 |
| 49 | Sm7.4Fe77.8Zr1.5N13.3 | 40 | 12 | 9.5 | 11.7 | 18.2 | 8.1 | 11.6 | 14.8 |
| 50 | Sm8.9Fe77.3Zr0.2N13.6 | 40 | 11 | 8.9 | 12.7 | 17.1 | 7.5 | 12.7 | 13.9 |
| 51 | Sm8.6Fe77.3Zr0.5N13.6 | 40 | 11 | 9.0 | 12.4 | 17.9 | 7.6 | 12.3 | 14.7 |
| 52 | Sm8.2Fe77.3Zr0.9N13.6 | 40 | 10 | 9.1 | 12.0 | 18.0 | 7.7 | 11.9 | 14.6 |
| 53 | Sm7.6Fe77.3Zr1.5N13.6 | 40 | 12 | 9.0 | 11.8 | 17.7 | 7.6 | 11.7 | 14.4 |
| 54 | Sm9.5Fe75.0Zr0.5N15.0 | 40 | 12 | 8.5 | 15.3 | 17.0 | 7.2 | 15.0 | 13.8 |
| 55 | Sm9.0Fe75.0Zr1.0N15.0 | 40 | 10 | 8.6 | 14.9 | 17.2 | 7.2 | 14.8 | 13.9 |
| 56 | Sm8.5Fe75.0Zr1.5N15.0 | 40 | 11 | 8.3 | 14.1 | 16.3 | 7.0 | 14.0 | 13.3 |

Example 4

SmFeSiN Magnet Powders and Bonded Magnets

Magnet alloys of the compositions shown in TABLE 4 were prepared. Peripheral speed of the quenching roll, thickness of the flaky magnet powders, magnetic properties of the magnet powders and the bonded magnets are also shown in TABLE 4. FIG. 4 shows the X-ray diffraction chart (Co—Kα) of the magnet powder prepared in Example 4, Run No.11.

TABLE 4

SmFeSiN

| No. | Alloy Composition | Sp m/s | T μm | Powder Br (kG) | iHc (kOe) | (BH)max (MGOe) | Magnet Br (kG) | iHc (kOe) | (BH)max (MGOe) |
|---|---|---|---|---|---|---|---|---|---|
| 1 | Sm8.0Fe79.8Si0.2N12.0 | 30 | 15 | 9.2 | 7.9 | 16.5 | 7.8 | 7.9 | 13.5 |
| 2 | Sm8.0Fe79.8Si0.2N12.0 | 40 | 12 | 9.3 | 7.8 | 16.6 | 7.9 | 7.7 | 13.6 |
| 3 | Sm8.0Fe79.2Si0.8N12.0 | 30 | 14 | 9.2 | 8.0 | 16.5 | 7.8 | 7.9 | 13.5 |
| 4 | Sm8.0Fe79.2Si0.8N12.0 | 40 | 12 | 9.2 | 8.4 | 16.7 | 7.9 | 8.3 | 13.7 |
| 5 | Sm8.3Fe79.0Si0.2N12.5 | 20 | 21 | 9.2 | 8.4 | 16.5 | 7.8 | 8.3 | 13.7 |
| 6 | Sm8.3Fe79.0Si0.2N12.5 | 30 | 16 | 9.4 | 8.7 | 16.9 | 8.0 | 8.6 | 14.0 |
| 7 | Sm8.3Fe79.0Si0.2N12.5 | 35 | 13 | 9.5 | 8.7 | 17.1 | 8.1 | 8.6 | 14.2 |
| 8 | Sm8.3Fe79.0Si0.2N12.5 | 40 | 11 | 9.5 | 8.6 | 17.1 | 8.1 | 8.5 | 14.0 |
| 9 | Sm8.3Fe79.0Si0.2N12.5 | 45 | 10 | 9.6 | 8.4 | 17.0 | 8.2 | 8.3 | 13.9 |
| 10 | Sm8.3Fe78.4Si0.8N12.5 | 30 | 14 | 9.0 | 9.1 | 16.7 | 7.7 | 9.1 | 13.6 |
| 11 | Sm8.3Fe78.4Si0.8N12.5 | 40 | 11 | 9.1 | 9.0 | 16.9 | 7.7 | 8.9 | 13.9 |
| 12 | Sm8.7Fe78.1Si0.2N13.0 | 30 | 15 | 8.6 | 10.3 | 16.2 | 7.2 | 10.2 | 13.3 |
| 13 | Sm8.7Fe78.1Si0.2N13.0 | 40 | 12 | 8.8 | 10.2 | 16.4 | 7.5 | 10.1 | 13.4 |
| 14 | Sm8.7Fe77.5Si0.8N13.0 | 30 | 18 | 8.5 | 10.8 | 16.3 | 7.1 | 10.7 | 13.3 |
| 15 | Sm8.7Fe77.5Si0.8N13.0 | 40 | 11 | 8.5 | 11.1 | 16.4 | 7.2 | 11.0 | 13.4 |

Example 5

SmFeNbN Magnet Powders and Bonded Magnets

Magnet alloys of the compositions shown in TABLE 5 were prepared. Peripheral speed of the quenching roll, thickness of the flaky magnet powders, magnetic properties of the magnet powders and bonded magnets are also shown in TABLE 5. FIG. 5 shows the X-ray diffraction chart (Co—Kα) of the magnet powder prepared in Example 5, Run No.11.

TABLE 5

| | | | | SmFeNbN | | | | | |
| | | | | | Powder | | | Magnet | |
| No. | Alloy Composition | Sp m/s | T μm | Br (kG) | iHc (kOe) | (BH)max (MGOe) | Br (kG) | iHc (kOe) | (BH)max (MGOe) |
|---|---|---|---|---|---|---|---|---|---|
| 1 | $Sm_{8.0}Fe_{79.8}Nb_{0.2}N_{12.0}$ | 30 | 17 | 9.5 | 7.6 | 16.4 | 8.1 | 7.6 | 13.4 |
| 2 | $Sm_{8.0}Fe_{79.8}Nb_{0.2}N_{12.0}$ | 40 | 12 | 9.6 | 7.7 | 16.6 | 8.2 | 7.6 | 13.6 |
| 3 | $Sm_{8.0}Fe_{79.2}Nb_{0.8}N_{12.0}$ | 30 | 16 | 9.4 | 8.0 | 16.2 | 8.0 | 7.9 | 13.3 |
| 4 | $Sm_{8.0}Fe_{79.2}Nb_{0.8}N_{12.0}$ | 40 | 13 | 9.5 | 7.9 | 16.4 | 8.1 | 7.8 | 13.4 |
| 5 | $Sm_{8.3}Fe_{79.0}Nb_{0.2}N_{12.5}$ | 20 | 22 | 9.2 | 8.3 | 16.1 | 7.8 | 8.2 | 13.2 |
| 6 | $Sm_{8.3}Fe_{79.0}Nb_{0.2}N_{12.5}$ | 30 | 19 | 9.4 | 8.5 | 16.5 | 8.0 | 8.4 | 13.7 |
| 7 | $Sm_{8.3}Fe_{79.0}Nb_{0.2}N_{12.5}$ | 35 | 13 | 9.6 | 8.7 | 17.2 | 8.2 | 8.6 | 14.1 |
| 8 | $Sm_{8.3}Fe_{79.0}Nb_{0.2}N_{12.5}$ | 40 | 12 | 9.5 | 8.9 | 17.1 | 8.1 | 8.8 | 14.0 |
| 9 | $Sm_{8.3}Fe_{79.0}Nb_{0.2}N_{12.5}$ | 45 | 11 | 9.5 | 8.9 | 17.1 | 8.1 | 8.8 | 14.0 |
| 10 | $Sm_{8.3}Fe_{78.4}Nb_{0.8}N_{12.5}$ | 30 | 15 | 9.3 | 9.1 | 16.7 | 8.0 | 9.1 | 13.6 |
| 11 | $Sm_{8.3}Fe_{78.4}Nb_{0.8}N_{12.5}$ | 40 | 11 | 9.4 | 9.1 | 17.2 | 8.0 | 9.0 | 14.1 |
| 12 | $Sm_{8.7}Fe_{78.1}Nb_{0.2}N_{13.0}$ | 30 | 16 | 8.8 | 10.0 | 16.0 | 7.4 | 9.9 | 13.1 |
| 13 | $Sm_{8.7}Fe_{78.1}Nb_{0.2}N_{13.0}$ | 40 | 10 | 9.0 | 10.4 | 16.8 | 7.7 | 10.3 | 13.8 |
| 14 | $Sm_{8.7}Fe_{77.5}Nb_{0.8}N_{13.0}$ | 30 | 16 | 8.8 | 10.6 | 16.0 | 7.4 | 10.5 | 13.1 |
| 15 | $Sm_{8.7}Fe_{77.5}Nb_{0.8}N_{13.0}$ | 40 | 11 | 8.8 | 10.8 | 16.2 | 7.5 | 10.7 | 13.3 |

Example 6

SmFeTiN Magnet Powders and Bonded Magnets

Magnet alloys of the compositions shown in TABLE 6 were prepared. Peripheral speed of the quenching roll, thickness of the flaky magnet powders, magnetic properties of the magnet powders and the bonded magnets are also shown in TABLE 6. FIG. 6 shows the X-ray diffraction chart (Co—Kα) of the magnet powder prepared in Example 6, Run No.11.

TABLE 6

| | | | | SmFeTiN | | | | | |
| | | | | | Powder | | | Magnet | |
| No. | Alloy Composition | Sp m/s | T μm | Br (kG) | iHc (kOe) | (BH)max (MGOe) | Br (kG) | iHc (kOe) | (BH)max (MGOe) |
|---|---|---|---|---|---|---|---|---|---|
| 1 | $Sm_{8.0}Fe_{79.8}Ti_{0.2}N_{12.0}$ | 30 | 15 | 9.4 | 7.8 | 16.8 | 8.0 | 7.8 | 13.8 |
| 2 | $Sm_{8.0}Fe_{79.8}Ti_{0.2}N_{12.0}$ | 40 | 12 | 9.5 | 7.6 | 16.9 | 8.1 | 7.5 | 13.9 |
| 3 | $Sm_{8.0}Fe_{79.2}Ti_{0.8}N_{12.0}$ | 30 | 17 | 9.3 | 7.9 | 16.7 | 7.9 | 7.8 | 13.8 |
| 4 | $Sm_{8.0}Fe_{79.2}Ti_{0.8}N_{12.0}$ | 40 | 11 | 9.3 | 8.2 | 16.8 | 7.9 | 8.1 | 13.8 |
| 5 | $Sm_{8.3}Fe_{79.0}Ti_{0.2}N_{12.5}$ | 25 | 23 | 9.2 | 8.2 | 16.5 | 7.8 | 8.1 | 13.7 |
| 6 | $Sm_{8.3}Fe_{79.0}Ti_{0.2}N_{12.5}$ | 30 | 16 | 9.4 | 8.7 | 16.9 | 8.0 | 8.6 | 14.0 |
| 7 | $Sm_{8.3}Fe_{79.0}Ti_{0.2}N_{12.5}$ | 35 | 14 | 9.6 | 8.3 | 17.5 | 8.2 | 8.2 | 14.4 |
| 8 | $Sm_{8.3}Fe_{79.0}Ti_{0.2}N_{12.5}$ | 40 | 12 | 9.5 | 8.6 | 17.6 | 8.1 | 8.5 | 14.4 |
| 9 | $Sm_{8.3}Fe_{79.0}Ti_{0.2}N_{12.5}$ | 45 | 10 | 9.5 | 8.6 | 17.6 | 8.1 | 8.5 | 14.4 |
| 10 | $Sm_{8.3}Fe_{78.4}Ti_{0.8}N_{12.5}$ | 30 | 16 | 9.3 | 9.0 | 17.1 | 8.0 | 9.0 | 13.9 |
| 11 | $Sm_{8.3}Fe_{78.4}Ti_{0.8}N_{12.5}$ | 40 | 11 | 9.4 | 9.3 | 17.8 | 8.0 | 9.2 | 14.6 |
| 12 | $Sm_{8.7}Fe_{78.1}Ti_{0.2}N_{13.0}$ | 30 | 15 | 8.7 | 10.2 | 16.4 | 7.3 | 10.1 | 13.4 |
| 13 | $Sm_{8.7}Fe_{78.1}Ti_{0.2}N_{13.0}$ | 40 | 11 | 8.9 | 10.4 | 17.1 | 7.6 | 10.3 | 14.0 |
| 14 | $Sm_{8.7}Fe_{77.5}Ti_{0.8}N_{13.0}$ | 30 | 16 | 8.6 | 10.6 | 16.3 | 7.2 | 10.5 | 13.3 |
| 15 | $Sm_{8.7}Fe_{77.5}Ti_{0.8}N_{13.0}$ | 40 | 12 | 8.8 | 11.0 | 16.7 | 7.5 | 10.9 | 13.7 |

Example 7

SmFeGaN Magnet Powders and Bonded Magnets

Magnet alloys of the compositions shown in TABLE 7 were prepared. Peripheral speed of the quenching roll, thickness of the flaky magnet powders, magnetic properties of the magnet powders and the bonded magnets are also shown in TABLE 7. FIG. 7 shows the X-ray diffraction chart (Co—Kα) of the magnet powder prepared in Example 7, Run No. 11.

TABLE 7

SmFeGaN

| No. | Alloy Composition | Sp m/s | T μm | Powder | | | Magnet | | |
|---|---|---|---|---|---|---|---|---|---|
| | | | | Br (kG) | iHc (kOe) | (BH)max (MGOe) | Br (kG) | iHc (kOe) | (BH)max (MGOe) |
| 1 | Sm8.0Fe79.8Ga0.2N12.0 | 30 | 15 | 9.6 | 7.7 | 17.0 | 8.2 | 7.7 | 13.9 |
| 2 | Sm8.0Fe79.8Ga0.2N12.0 | 40 | 10 | 9.6 | 7.9 | 17.2 | 8.2 | 7.8 | 14.1 |
| 3 | Sm8.0Fe79.2Ga0.8N12.0 | 30 | 15 | 9.4 | 8.0 | 16.8 | 8.0 | 7.9 | 13.8 |
| 4 | Sm8.0Fe79.2Ga0.8N12.0 | 40 | 11 | 9.4 | 7.9 | 16.9 | 8.0 | 7.8 | 13.9 |
| 5 | Sm8.3Fe79.0Ga0.2N12.5 | 25 | 20 | 9.0 | 8.4 | 16.4 | 7.7 | 8.3 | 13.6 |
| 6 | Sm8.3Fe79.0Ga0.2N12.5 | 30 | 17 | 9.3 | 8.6 | 16.9 | 7.9 | 8.5 | 14.0 |
| 7 | Sm8.3Fe79.0Ga0.2N12.5 | 35 | 14 | 9.2 | 8.6 | 16.7 | 7.8 | 8.5 | 13.8 |
| 8 | Sm8.3Fe79.0Ga0.2N12.5 | 40 | 12 | 9.3 | 8.9 | 17.0 | 7.9 | 8.8 | 13.9 |
| 9 | Sm8.3Fe79.0Ga0.2N12.5 | 45 | 10 | 9.4 | 8.7 | 16.9 | 8.0 | 8.6 | 13.9 |
| 10 | Sm8.3Fe78.4Ga0.8N12.5 | 30 | 16 | 9.2 | 9.2 | 16.9 | 7.9 | 9.2 | 13.8 |
| 11 | Sm8.3Fe78.4Ga0.8N12.5 | 40 | 12 | 9.2 | 9.3 | 16.9 | 7.8 | 9.2 | 13.9 |
| 12 | Sm8.7Fe78.1Ga0.2N13.0 | 30 | 15 | 8.8 | 10.4 | 16.4 | 7.4 | 10.3 | 13.4 |
| 13 | Sm8.7Fe78.1Ga0.2N13.0 | 40 | 10 | 8.9 | 10.3 | 16.6 | 7.6 | 10.2 | 13.6 |
| 14 | Sm8.7Fe77.5Ga0.8N13.0 | 30 | 15 | 8.7 | 10.4 | 15.9 | 7.3 | 10.3 | 13.0 |
| 15 | Sm8.7Fe77.5Ga0.8N13.0 | 40 | 11 | 8.7 | 10.8 | 16.4 | 7.4 | 10.7 | 13.4 |

Example 8

SmFeAlN Magnet Powders and Bonded Magnets

Magnet alloys of the compositions shown in TABLE 8 were prepared. Peripheral speed of the quenching roll, thickness of the flaky magnet powders, magnetic properties of the magnet powders and the bonded magnets are also shown in TABLE 8. FIG. 8 shows the X-ray diffraction chart (Co—Kα) of the magnet powder prepared in Example 8, Run No.11.

TABLE 8

SmFeAlN

| No. | Alloy Composition | Sp m/s | T μm | Powder | | | Magnet | | |
|---|---|---|---|---|---|---|---|---|---|
| | | | | Br (kG) | iHc (kOe) | (BH)max (MGOe) | Br (kG) | iHc (kOe) | (BH)max (MGOe) |
| 1 | Sm8.0Fe79.8Al0.2N12.0 | 30 | 16 | 9.6 | 7.7 | 17.0 | 8.2 | 7.7 | 13.9 |
| 2 | Sm8.0Fe79.8Al0.2N12.0 | 40 | 12 | 9.6 | 7.6 | 17.0 | 8.2 | 7.5 | 13.9 |
| 3 | Sm8.0Fe79.2Al0.8N12.0 | 30 | 16 | 9.5 | 8.0 | 16.8 | 8.1 | 7.9 | 13.8 |
| 4 | Sm8.0Fe79.2Al0.8N12.0 | 40 | 10 | 9.6 | 7.9 | 17.0 | 8.2 | 7.8 | 13.9 |
| 5 | Sm8.3Fe79.0Al0.2N12.5 | 30 | 22 | 9.2 | 8.1 | 16.5 | 7.8 | 8.0 | 13.7 |
| 6 | Sm8.3Fe79.0Al0.2N12.5 | 30 | 15 | 9.4 | 8.3 | 16.9 | 8.0 | 8.2 | 14.0 |
| 7 | Sm8.3Fe79.0Al0.2N12.5 | 30 | 14 | 9.4 | 8.6 | 17.0 | 8.0 | 8.5 | 14.1 |
| 8 | Sm8.3Fe79.0Al0.2N12.5 | 40 | 13 | 9.5 | 8.4 | 17.2 | 8.1 | 8.3 | 14.1 |
| 9 | Sm8.3Fe79.0Al0.2N12.5 | 40 | 11 | 9.4 | 8.5 | 16.9 | 8.0 | 8.4 | 13.9 |
| 10 | Sm8.3Fe78.4Al0.8N12.5 | 30 | 15 | 9.4 | 9.0 | 17.4 | 8.1 | 9.0 | 14.2 |
| 11 | Sm8.3Fe78.4Al0.8N12.5 | 40 | 11 | 9.4 | 9.1 | 17.6 | 8.0 | 9.0 | 14.4 |
| 12 | Sm8.7Fe78.1Al0.2N13.0 | 30 | 16 | 8.9 | 10.0 | 16.6 | 7.5 | 9.9 | 13.6 |
| 13 | Sm8.7Fe78.1Al0.2N13.0 | 40 | 12 | 9.0 | 10.1 | 17.0 | 7.7 | 10.0 | 13.9 |
| 14 | Sm8.7Fe77.5Al0.8N13.0 | 30 | 16 | 8.8 | 10.2 | 16.3 | 7.4 | 10.1 | 13.3 |
| 15 | Sm8.7Fe77.5Al0.8N13.0 | 40 | 11 | 8.9 | 10.4 | 16.6 | 7.6 | 10.3 | 13.6 |

Example 9

SmFeTaN Magnet Powders and Bonded Magnets

Magnet alloys of the compositions shown in TABLE 9 were prepared. Peripheral speed of the quenching roll, thickness of the flaky magnet powders, magnetic properties of the magnet powders and the bonded magnets are also shown in TABLE 9. FIG. 9 shows the X-ray diffraction chart (Co—K$\alpha$) of the magnet powder prepared in Example 9, Run No.11.

TABLE 9

| | | | | SmFeTaN | | | | | |
|---|---|---|---|---|---|---|---|---|---|
| | | | | | Powder | | | Magnet | |
| No. | Alloy Composition | Sp m/s | T μm | Br (kG) | iHc (kOe) | (BH)max (MGOe) | Br (kG) | iHc (kOe) | (BH)max (MGOe) |
| 1 | Sm8.0Fe79.8Ta0.2N12.0 | 30 | 16 | 9.5 | 7.6 | 16.9 | 8.1 | 7.6 | 13.9 |
| 2 | Sm8.0Fe79.8Ta0.2N12.0 | 40 | 12 | 9.6 | 7.7 | 17.1 | 8.2 | 7.6 | 14.0 |
| 3 | Sm8.0Fe79.2Ta0.8N12.0 | 30 | 16 | 9.4 | 8.0 | 16.7 | 8.0 | 7.9 | 13.7 |
| 4 | Sm8.0Fe79.2Ta0.8N12.0 | 40 | 10 | 9.5 | 7.9 | 16.9 | 8.1 | 7.8 | 13.9 |
| 5 | Sm8.3Fe79.0Ta0.2N12.5 | 25 | 21 | 9.3 | 8.2 | 16.6 | 7.9 | 8.1 | 13.8 |
| 6 | Sm8.3Fe79.0Ta0.2N12.5 | 30 | 15 | 9.4 | 8.5 | 17.0 | 8.0 | 8.4 | 14.1 |
| 7 | Sm8.3Fe79.0Ta0.2N12.5 | 35 | 13 | 9.5 | 8.6 | 17.4 | 8.1 | 8.5 | 14.3 |
| 8 | Sm8.3Fe79.0Ta0.2N12.5 | 40 | 13 | 9.5 | 8.9 | 17.6 | 8.1 | 8.8 | 14.4 |
| 9 | Sm8.3Fe79.0Ta0.2N12.5 | 45 | 10 | 9.6 | 8.4 | 17.5 | 8.2 | 8.3 | 14.4 |
| 10 | Sm8.3Fe78.4Ta0.8N12.5 | 30 | 15 | 9.3 | 9.1 | 17.2 | 8.0 | 9.1 | 14.0 |
| 11 | Sm8.3Fe78.4Ta0.8N12.5 | 40 | 11 | 9.4 | 9.1 | 17.7 | 8.0 | 9.0 | 14.5 |
| 12 | Sm8.7Fe78.1Ta0.2N13.0 | 30 | 16 | 8.8 | 10.0 | 16.5 | 7.4 | 9.9 | 13.5 |
| 13 | Sm8.7Fe78.1Ta0.2N13.0 | 40 | 12 | 9.0 | 10.4 | 17.3 | 7.7 | 10.3 | 14.2 |
| 14 | Sm8.7Fe77.5Ta0.8N13.0 | 30 | 16 | 8.8 | 10.6 | 16.5 | 7.4 | 10.5 | 13.5 |
| 15 | Sm8.7Fe77.5Ta0.8N13.0 | 40 | 11 | 8.8 | 10.8 | 16.7 | 7.5 | 10.7 | 13.7 |

Example 10

SmFeCN Magnet Powders and Bonded Magnets

Magnet alloys of the compositions shown in TABLE 10 were prepared. Peripheral speed of the quenching roll, thickness of the flaky magnet powders, magnetic properties of the magnet powders and the bonded magnets are also shown in TABLE 10. FIG. 10 shows the X-ray X-ray diffraction chart (Co—K$\alpha$) of the magnet powder prepared in Example 10, Run No.11.

TABLE 10

| | | | | SmFeCN | | | | | |
|---|---|---|---|---|---|---|---|---|---|
| | | | | | Powder | | | Magnet | |
| No. | Alloy Composition | Sp m/s | T μm | Br (kG) | iHc (kOe) | (BH)max (MGOe) | Br (kG) | iHc (kOe) | (BH)max (MGOe) |
| 1 | Sm8.0Fe79.8C0.2N12.0 | 30 | 16 | 9.8 | 7.2 | 16.6 | 8.3 | 7.2 | 13.6 |
| 2 | Sm8.0Fe79.8C0.2N12.0 | 40 | 10 | 9.8 | 7.3 | 16.6 | 8.3 | 7.2 | 13.6 |
| 3 | Sm8.0Fe79.2C0.8N12.0 | 30 | 15 | 9.6 | 7.0 | 16.4 | 8.1 | 6.9 | 13.5 |
| 4 | Sm8.0Fe79.2C0.8N12.0 | 40 | 13 | 9.7 | 7.1 | 16.5 | 8.2 | 7.0 | 13.5 |
| 5 | Sm8.3Fe79.0C0.2N12.5 | 20 | 20 | 9.3 | 8.4 | 16.1 | 7.9 | 8.3 | 13.4 |
| 6 | Sm8.3Fe79.0C0.2N12.5 | 30 | 17 | 9.5 | 8.7 | 16.7 | 8.1 | 8.6 | 13.9 |
| 7 | Sm8.3Fe79.0C0.2N12.5 | 35 | 14 | 9.6 | 8.5 | 16.8 | 8.2 | 8.4 | 14.0 |
| 8 | Sm8.3Fe79.0C0.2N12.5 | 40 | 11 | 9.6 | 8.6 | 16.8 | 8.2 | 8.5 | 13.8 |
| 9 | Sm8.3Fe79.0C0.2N12.5 | 45 | 10 | 9.5 | 8.8 | 16.7 | 8.1 | 8.7 | 13.7 |
| 10 | Sm8.3Fe78.4C0.8N12.5 | 30 | 15 | 9.7 | 7.8 | 16.5 | 8.3 | 7.8 | 13.5 |
| 11 | Sm8.3Fe78.4C0.8N12.5 | 40 | 11 | 9.6 | 7.9 | 16.7 | 8.1 | 7.8 | 13.7 |
| 12 | Sm8.7Fe78.1C0.2N13.0 | 30 | 16 | 9.4 | 9.4 | 16.0 | 7.9 | 9.3 | 13.1 |
| 13 | Sm8.7Fe78.1C0.2N13.0 | 40 | 12 | 9.4 | 9.4 | 16.2 | 8.0 | 9.3 | 13.3 |
| 14 | Sm8.7Fe77.5C0.8N13.0 | 30 | 16 | 9.2 | 9.2 | 16.1 | 7.7 | 9.1 | 13.2 |
| 15 | Sm8.7Fe77.5C0.8N13.0 | 40 | 11 | 9.3 | 9.0 | 16.2 | 7.9 | 8.9 | 13.3 |

Example 11

SmCeFeN Magnet Powders and Bonded Magnets

In SmFeN magnets some parts of Sm were substituted with Ce prepare the magnet alloys of the compositions shown in TABLE 11. Peripheral speed of the quenching roll was always 40 m/sec. Magnetic properties of the magnet powders and the bonded magnets are also shown in TABLE 11. FIG. 11 show the X-ray diffraction chart (Co—Kα) the magnet powder prepared in Example 11, Run No.1.

TABLE 11

| | | SmCeFeN | | | | |
|---|---|---|---|---|---|---|
| | | Powder | | | Magnet | |
| No. | Alloy Composition | Br (kG) | iHc (kOe) | (BH)max (MGOe) | Br (kG) | iHc (kOe) | (BH)max (MGOe) |
| 1 | Sm7.5Ce0.8Fe79.2N12.5 | 9.9 | 9.4 | 17.6 | 8.4 | 9.3 | 14.3 |
| 2 | Sm7.3Ce0.8Fe79.6N12.3 | 10.3 | 7.8 | 17.3 | 8.7 | 7.6 | 13.8 |
| 3 | Sm8.1Ce0.3Fe79.2N12.4 | 9.5 | 9.4 | 17.3 | 8.1 | 9.3 | 14.0 |
| 4 | Sm7.9Ce0.3Fe79.6N12.2 | 9.3 | 7.7 | 16.3 | 7.9 | 7.6 | 13.4 |

Example 12

SmFeCoN Magnet Powders and Bonded Magnets

In SmFeN magnets some parts of Fe were substituted with Co prepare the magnet alloys of the compositions shown in TABLE 12. peripheral speed of the quenching roll, magnetic properties of the magnet powders and the bonded magnets are also shown in TABLE 12. FIG. 12 shows the X-ray diffraction chart (Co—Kα) of the magnet powder prepared in Example 12, Run No.49.

TABLE 12

| | | | | SmFeCoN | | | | | |
|---|---|---|---|---|---|---|---|---|---|
| | | | | Powder | | | Magnet | | |
| No. | Alloy Composition | Sp m/s | T μm | Br (kG) | iHc (kOe) | (BH)max (MGOe) | Br (kG) | iHc (kOe) | (BH)max (MGOe) |
| 1 | Sm7.1Fe78.0Co4.1N10.7 | 40 | 11 | 10.0 | 6.0 | 16.3 | 8.4 | 6.0 | 13.4 |
| 2 | Sm7.1Fe69.8Co12.3N10.7 | 40 | 11 | 10.4 | 6.2 | 17.1 | 8.6 | 6.0 | 14.2 |
| 3 | Sm7.7Fe76.7Co4.0N11.5 | 40 | 10 | 10.2 | 6.8 | 17.6 | 8.5 | 6.6 | 14.4 |
| 4 | Sm7.7Fe68.7Co12.1N11.5 | 40 | 12 | 10.5 | 6.9 | 17.8 | 8.7 | 6.6 | 14.6 |
| 5 | Sm7.8Fe76.4Co4.0N11.8 | 40 | 13 | 10.0 | 7.3 | 17.6 | 8.4 | 7.2 | 14.5 |
| 6 | Sm7.8Fe72.4Co8.0N11.8 | 40 | 11 | 10.2 | 7.4 | 18.1 | 8.7 | 7.4 | 14.9 |
| 7 | Sm7.8Fe68.3Co12.1N11.8 | 40 | 12 | 10.3 | 7.4 | 18.4 | 8.9 | 7.4 | 15.1 |
| 8 | Sm7.8Fe64.3Co16.1N11.8 | 40 | 10 | 10.3 | 7.2 | 18.2 | 8.8 | 7.3 | 15.0 |
| 9 | Sm7.8Fe60.3Co20.1N11.8 | 40 | 11 | 10.1 | 7.5 | 18.0 | 8.6 | 7.4 | 14.6 |
| 10 | Sm8.0Fe76.0Co4.0N12.0 | 40 | 12 | 9.7 | 7.6 | 17.5 | 8.3 | 7.4 | 14.4 |
| 11 | Sm8.0Fe72.0Co8.0N12.0 | 40 | 12 | 10.2 | 7.8 | 18.6 | 8.8 | 7.6 | 15.3 |
| 12 | Sm8.0Fe68.0Co12.0N12.0 | 40 | 11 | 10.4 | 7.8 | 19.0 | 8.9 | 7.8 | 15.7 |
| 13 | Sm8.0Fe64.0Co16.0N12.0 | 40 | 13 | 10.3 | 8.0 | 18.8 | 8.8 | 7.9 | 15.5 |
| 14 | Sm8.0Fe60.0Co20.0N12.0 | 40 | 11 | 10.1 | 7.8 | 18.3 | 8.5 | 7.9 | 14.7 |
| 15 | Sm8.2Fe77.6Co2.0N12.2 | 40 | 12 | 9.6 | 7.9 | 17.5 | 8.3 | 7.8 | 14.5 |
| 16 | Sm8.2Fe75.6Co4.0N12.2 | 40 | 10 | 9.8 | 8.2 | 18.2 | 8.4 | 8.1 | 15.0 |
| 17 | Sm8.2Fe71.6Co8.0N12.2 | 25 | 21 | 9.0 | 8.0 | 14.8 | 7.3 | 7.8 | 11.3 |
| 18 | Sm8.2Fe71.6Co8.0N12.2 | 30 | 18 | 9.5 | 8.3 | 17.0 | 8.2 | 8.2 | 14.4 |
| 19 | Sm8.2Fe71.6Co8.0N12.2 | 35 | 16 | 9.7 | 8.2 | 17.8 | 8.2 | 8.2 | 14.6 |
| 20 | Sm8.2Fe71.6Co8.0N12.2 | 40 | 11 | 9.9 | 8.6 | 18.4 | 8.4 | 8.6 | 15.1 |
| 21 | Sm8.2Fe71.6Co8.0N12.2 | 45 | 10 | 9.8 | 8.8 | 18.3 | 8.3 | 8.7 | 14.7 |
| 22 | Sm8.2Fe71.6Co8.0N12.2 | 50 | 8 | 9.6 | 8.7 | 16.4 | 8.0 | 8.5 | 13.3 |
| 23 | Sm8.2Fe67.7Co11.9N12.2 | 25 | 19 | 8.8 | 7.9 | 14.5 | 7.1 | 7.8 | 10.6 |
| 24 | Sm8.2Fe67.7Co11.9N12.2 | 30 | 17 | 10.0 | 8.6 | 18.1 | 8.4 | 8.5 | 14.6 |
| 25 | Sm8.2Fe67.7Co11.9N12.2 | 35 | 15 | 10.4 | 8.4 | 18.9 | 8.8 | 8.3 | 15.8 |

TABLE 12-continued

| | | | | SmFeCoN | | | | | |
| | | | | | Powder | | | Magnet | |
| No. | Alloy Composition | Sp m/s | T μm | Br (kG) | iHc (kOe) | (BH)max (MGOe) | Br (kG) | iHc (kOe) | (BH)max (MGOe) |
| --- | --- | --- | --- | --- | --- | --- | --- | --- | --- |
| 26 | Sm8.2Fe67.7Co11.9N12.2 | 40 | 11 | 10.2 | 8.8 | 18.9 | 8.7 | 8.8 | 15.7 |
| 27 | Sm8.2Fe67.7Co11.9N12.2 | 45 | 11 | 10.0 | 8.6 | 18.3 | 8.5 | 8.6 | 15.2 |
| 28 | Sm8.2Fe67.7Co11.9N12.2 | 50 | 9 | 9.4 | 8.8 | 14.7 | 8.0 | 8.6 | 11.1 |
| 29 | Sm8.2Fe63.7Co15.9N12.2 | 25 | 22 | 9.1 | 7.9 | 15.4 | 7.5 | 7.8 | 11.9 |
| 30 | Sm8.2Fe63.7Co15.9N12.2 | 30 | 16 | 9.8 | 8.7 | 17.9 | 8.3 | 8.8 | 14.3 |
| 31 | Sm8.2Fe63.7Co15.9N12.2 | 35 | 15 | 10.1 | 9.0 | 18.6 | 8.5 | 9.0 | 15.3 |
| 32 | Sm8.2Fe63.7Co15.9N12.2 | 40 | 12 | 10.3 | 8.9 | 19.0 | 8.7 | 8.8 | 15.6 |
| 33 | Sm8.2Fe63.7Co15.9N12.2 | 45 | 11 | 10.3 | 9.1 | 19.2 | 8.6 | 9.2 | 15.5 |
| 34 | Sm8.2Fe63.7Co15.9N12.2 | 50 | 10 | 10.1 | 8.9 | 16.8 | 8.4 | 8.9 | 13.5 |
| 35 | Sm8.2Fe59.7Co19.9N12.2 | 40 | 11 | 10.2 | 8.6 | 18.6 | 8.6 | 8.6 | 15.2 |
| 36 | Sm8.2Fe52.5Co27.1N12.2 | 40 | 12 | 9.9 | 8.4 | 18.0 | 8.4 | 8.4 | 15.0 |
| 37 | Sm8.2Fe43.8Co35.8N12.2 | 40 | 11 | 9.5 | 8.2 | 17.2 | 8.2 | 8.1 | 14.3 |
| 38 | Sm8.3Fe77.2Co2.0N12.5 | 40 | 10 | 9.5 | 8.7 | 17.6 | 8.2 | 8.6 | 14.4 |
| 39 | Sm8.3Fe75.2Co4.0N12.5 | 40 | 11 | 9.7 | 9.1 | 18.4 | 8.4 | 9.1 | 15.3 |
| 40 | Sm8.3Fe71.3Co7.9N12.5 | 25 | 18 | 9.1 | 9.0 | 15.7 | 7.5 | 8.8 | 12.7 |
| 41 | Sm8.3Fe71.3Co7.9N12.5 | 30 | 16 | 9.8 | 9.5 | 18.1 | 8.2 | 9.4 | 14.7 |
| 42 | Sm8.3Fe71.3Co7.9N12.5 | 35 | 13 | 10.2 | 9.3 | 18.8 | 8.7 | 9.1 | 15.6 |
| 43 | Sm8.3Fe71.3Co7.9N12.5 | 40 | 12 | 10.3 | 9.3 | 19.2 | 8.7 | 9.2 | 15.7 |
| 44 | Sm8.3Fe71.3Co7.9N12.5 | 45 | 10 | 10.2 | 9.0 | 18.6 | 8.6 | 9.0 | 15.3 |
| 45 | Sm8.3Fe71.3Co7.9N12.5 | 50 | 8 | 10.0 | 8.8 | 16.6 | 8.3 | 8.5 | 13.5 |
| 46 | Sm8.3Fe67.3Co11.9N12.5 | 25 | 20 | 9.4 | 9.2 | 17.5 | 7.8 | 9.0 | 14.1 |
| 47 | Sm8.3Fe67.3Co11.9N12.5 | 30 | 18 | 9.8 | 9.1 | 17.8 | 8.1 | 9.0 | 14.5 |
| 48 | Sm8.3Fe67.3Co11.9N12.5 | 35 | 15 | 10.0 | 9.6 | 18.6 | 8.5 | 9.6 | 15.2 |
| 49 | Sm8.3Fe67.3Co11.9N12.5 | 40 | 13 | 10.2 | 9.5 | 19.3 | 8.7 | 9.4 | 15.9 |
| 50 | Sm8.3Fe67.3Co11.9N12.5 | 45 | 11 | 10.1 | 9.6 | 18.8 | 8.5 | 9.5 | 15.5 |
| 51 | Sm8.3Fe67.3Co11.9N12.5 | 50 | 10 | 9.7 | 9.2 | 17.1 | 8.1 | 9.1 | 13.7 |
| 52 | Sm8.3Fe63.3Co15.8N12.5 | 25 | 19 | 8.7 | 8.0 | 13.6 | 7.1 | 7.8 | 10.9 |
| 53 | Sm8.3Fe63.3Co15.8N12.5 | 30 | 17 | 9.8 | 9.8 | 18.0 | 8.4 | 9.6 | 14.6 |
| 54 | Sm8.3Fe63.3Co15.8N12.5 | 35 | 14 | 10.0 | 9.6 | 18.6 | 8.4 | 9.6 | 15.2 |
| 55 | Sm8.3Fe63.3Co15.8N12.5 | 40 | 12 | 10.0 | 9.7 | 18.7 | 8.5 | 9.6 | 15.5 |
| 56 | Sm8.3Fe63.3Co15.8N12.5 | 45 | 11 | 9.9 | 9.8 | 18.4 | 8.3 | 9.7 | 15.0 |
| 57 | Sm8.3Fe63.3Co15.8N12.5 | 50 | 10 | 9.8 | 9.6 | 16.4 | 8.0 | 9.5 | 13.1 |
| 58 | Sm8.3Fe59.4Co19.8N12.5 | 40 | 11 | 10.1 | 9.3 | 18.8 | 8.5 | 9.3 | 15.3 |
| 59 | Sm8.3Fe51.5Co27.7N12.5 | 40 | 12 | 9.7 | 9.5 | 18.6 | 8.4 | 9.4 | 15.1 |
| 60 | Sm8.3Fe43.5Co35.6N12.5 | 40 | 13 | 9.2 | 9.1 | 17.0 | 8.0 | 9.2 | 14.3 |
| 61 | Sm8.5Fe74.8Co3.9N12.8 | 40 | 10 | 9.3 | 10.1 | 17.2 | 8.1 | 10.0 | 14.4 |
| 62 | Sm8.5Fe70.9Co7.9N12.8 | 40 | 12 | 9.6 | 10.6 | 18.1 | 8.3 | 10.5 | 15.0 |
| 63 | Sm8.5Fe66.9Co11.8N12.8 | 40 | 11 | 9.8 | 10.2 | 18.7 | 8.4 | 10.0 | 15.5 |
| 64 | Sm8.5Fe63.0Co15.7N12.8 | 40 | 11 | 9.8 | 10.0 | 18.6 | 8.3 | 10.0 | 14.8 |
| 65 | Sm8.5Fe59.0Co19.7N12.8 | 40 | 12 | 9.4 | 9.9 | 17.8 | 8.1 | 9.7 | 14.6 |
| 66 | Sm8.7Fe74.3Co3.9N13.0 | 40 | 12 | 9.4 | 10.3 | 17.3 | 8.0 | 10.2 | 14.4 |
| 67 | Sm8.7Fe66.5Co11.7N13.0 | 40 | 13 | 9.3 | 10.7 | 17.5 | 8.0 | 10.8 | 14.5 |
| 68 | Sm10.0Fe71.3Co3.8N15.0 | 40 | 11 | 8.6 | 11.9 | 15.6 | 7.3 | 11.7 | 13.3 |
| 69 | Sm10.0Fe63.8Co11.3N15.0 | 40 | 12 | 8.6 | 12.9 | 16.1 | 7.3 | 12.9 | 13.6 |

Example 13

SmCeFeCoN Magnet Powders and Bonded Magnets

In SmFeN magnets some parts of Sm were substituted with Ce and some parts of Fe were substituted with Co to prepare the magnet alloys of the compositions shown in TABLE 13. Peripheral speed of the quenching roll was always 40 m/sec. Magnetic properties of the magnet powders and the bonded magnets are also shown in TABLE 13.

TABLE 13

| | | SmCeFeCoN | | | | | |
| | | Powder | | | Magnet | | |
| No. | Alloy Composition | Br (kG) | iHc (kOe) | (BH)max (MGOe) | Br (kG) | iHc (kOe) | (BH)max (MGOe) |
| --- | --- | --- | --- | --- | --- | --- | --- |
| 1 | Sm7.5Ce0.8Fe74.6Co4.6N12.5 | 9.8 | 9.6 | 17.5 | 8.4 | 9.3 | 14.4 |
| 2 | Sm7.5Ce0.8Fe68.4Co10.8N12.5 | 9.9 | 9.8 | 17.8 | 8.5 | 9.5 | 14.6 |
| 3 | Sm8.1Ce0.3Fe74.5Co4.6N12.5 | 9.5 | 9.9 | 17.3 | 8.1 | 9.6 | 14.2 |
| 4 | Sm8.1Ce0.3Fe68.4Co10.8N12.5 | 9.7 | 10.0 | 17.9 | 8.3 | 9.7 | 14.7 |

Example 14

SmFeCoM$^2$N Magnet Powders and Bonded Magnets

In some runs of Examples 4-10 a portion of Fe was replaced with Co to prepare the magnet alloys of the compositions shown in TABLE 14. Peripheral speed of the quenching roll was 40 m/sec. in all the runs. Magnetic properties of the magnet powders and the bonded magnets are also shown in TABLE 14.

TABLE 14

| | | SmFeCoM$^2$N | | | | | |
| | | Powder | | | Magnet | | |
| No. | Alloy Composition | Br (kG) | iHc (kOe) | (BH)max (MGOe) | Br (kG) | iHc (kOe) | (BH)max (MGOe) |
| --- | --- | --- | --- | --- | --- | --- | --- |
| 1 | Sm8.3Fe71.0Co7.7Si0.4N12.5 | 9.4 | 9.3 | 17.2 | 8.0 | 9.2 | 14.1 |
| 2 | Sm8.3Fe71.0Co7.7Nb0.4N12.5 | 9.6 | 9.0 | 17.7 | 8.2 | 8.9 | 14.5 |
| 3 | Sm8.3Fe71.0Co7.7Ti0.4N12.5 | 9.7 | 8.8 | 17.9 | 8.2 | 8.7 | 14.7 |
| 4 | Sm8.3Fe71.0Co7.7Ga0.4N12.5 | 9.4 | 9.1 | 17.0 | 8.0 | 9.0 | 13.9 |
| 5 | Sm8.3Fe71.0Co7.7Al0.4N12.5 | 9.6 | 8.9 | 17.6 | 8.2 | 8.8 | 14.4 |
| 6 | Sm8.3Fe71.0Co7.7Ta0.4N12.5 | 9.7 | 9.0 | 18.0 | 8.2 | 8.9 | 14.8 |
| 7 | Sm8.3Fe71.0Co7.7C0.4N12.5 | 9.9 | 8.3 | 17.1 | 8.4 | 8.2 | 14.0 |

Example 15

SmCeFeCoM²N Magnet Powders and Bonded Magnets

In some of SmFeM²N magnets a portion of Sm was replaced with Ce and a portion of Fe was replaced with Co to prepare the magnet alloys of the compositions shown in TABLE 15. Magnetic properties the magnet powders and the bonded magnets are also shown in TABLE 15.

TABLE 15

| | | SmFeCoM²N | | | | | |
|---|---|---|---|---|---|---|---|
| | | Powder | | | Magnet | | |
| No | Alloy Composition | Br (kG) | iHc (kOe) | (BH)max (MGOe) | Br (kG) | iHc (kOe) | (BH)max (MGOe) |
| 1 | Sm8.0Ce0.3Fe71.0Co7.7Si0.4N12.5 | 9.2 | 9.4 | 17.0 | 7.8 | 9.3 | 13.9 |
| 2 | Sm8.0Ce0.3Fe71.0Co7.7Nb0.4N12.5 | 9.4 | 9.3 | 17.2 | 8.0 | 9.2 | 14.1 |
| 3 | Sm8.0Ce0.3Fe71.0Co7.7Ti0.4N12.5 | 9.6 | 8.9 | 17.5 | 8.2 | 8.8 | 14.4 |
| 4 | Sm8.0Ce0.3Fe71.0Co7.7Ga0.4N12.5 | 9.2 | 9.3 | 16.8 | 7.8 | 9.2 | 13.8 |
| 5 | Sm8.0Ce0.3Fe71.0Co7.7Al0.4N12.5 | 9.4 | 9.0 | 17.1 | 8.0 | 8.9 | 14.0 |
| 6 | Sm8.0Ce0.3Fe71.0Co7.7Ta0.4N12.5 | 9.5 | 9.2 | 17.6 | 8.1 | 9.1 | 14.4 |
| 7 | Sm8.0Ce0.3Fe71.0Co7.7C0.4N12.5 | 9.7 | 8.6 | 17.1 | 8.2 | 8.5 | 14.0 |

Example 16

Annealing Temperature (Part 1, Sm8.3-Fe79.2-N12.5)

The flaky powder in Example 1, Run 18, was annealed at various temperatures in the range of 500-900° C. for various periods of time prior to the nitriding to find the suitable annealing conditions. Magnetic properties of the magnet powders and the bonded magnets relying on the annealing conditions are also shown in TABLE 16.

TABLE 16

| | Annealing Temperature | | | | | | | |
|---|---|---|---|---|---|---|---|---|
| | Annealing | | Powder | | | Magnet | | |
| No. | Temp (° C.) | Period (min.) | Br (kG) | iHc (kOe) | (BH)max (MGOe) | Br (kG) | iHc (kOe) | (BH)max (MGOe) |
| 1 | — | — | 9.6 | 4.2 | 10.1 | 8.2 | 4.1 | 8.2 |
| 2 | 500 | 10 | 9.9 | 7.0 | 15.4 | 8.4 | 6.9 | 12.6 |
| 3 | 600 | 10 | 9.8 | 7.3 | 16.3 | 8.3 | 7.1 | 13.2 |
| 4 | 700 | 10 | 9.7 | 7.6 | 17.2 | 8.2 | 7.4 | 14.0 |
| 5 | 700 | 30 | 9.5 | 8.5 | 17.2 | 8.1 | 8.4 | 14.0 |
| 6 | 700 | 60 | 9.3 | 9.2 | 16.9 | 7.9 | 8.9 | 13.8 |
| 7 | 700 | 120 | 9.0 | 9.7 | 16.6 | 7.7 | 9.5 | 13.5 |
| 8 | 700 | 300 | 8.8 | 10.0 | 16.2 | 7.5 | 9.8 | 13.2 |
| 9 | 720 | 10 | 9.7 | 8.0 | 17.3 | 8.2 | 7.8 | 14.1 |
| 10 | 750 | 10 | 9.6 | 8.5 | 17.5 | 8.2 | 8.3 | 14.2 |
| 11 | 750 | 30 | 9.4 | 9.2 | 17.4 | 8.0 | 9.1 | 14.1 |
| 12 | 750 | 60 | 9.1 | 9.6 | 17.0 | 7.7 | 9.3 | 13.8 |
| 13 | 750 | 120 | 8.9 | 10.1 | 16.5 | 7.6 | 9.9 | 13.5 |
| 14 | 750 | 300 | 8.6 | 10.7 | 16.0 | 7.3 | 10.5 | 13.1 |
| 15 | 780 | 10 | 9.4 | 9.1 | 17.3 | 8.0 | 8.9 | 14.1 |
| 16 | 800 | 10 | 9.1 | 9.8 | 17.0 | 7.7 | 9.5 | 13.8 |
| 17 | 820 | 10 | 8.9 | 10.4 | 16.8 | 7.6 | 10.2 | 13.6 |
| 18 | 850 | 10 | 8.6 | 11.2 | 16.2 | 7.3 | 11.0 | 13.2 |
| 19 | 900 | 10 | 8.2 | 13.1 | 15.1 | 7.0 | 12.7 | 12.3 |

Example 17

Annealing Temperature (Part 2, Sm8.5-Fe78.7-N12.8)

The flaky powder in Example 1, Run 22, was, as in Example 16, led at various temperatures in the range of 500-900° C. for various periods of time prior to the nitriding to find the suitable annealing conditions. Magnetic properties of the magnet powders and the bonded magnets relying on the annealing conditions are also shown in TABLE 17.

TABLE 17

| | Annealing | | Powder | | | Magnet | | |
|---|---|---|---|---|---|---|---|---|
| No. | Temp (° C.) | Period (min.) | Br (kG) | iHc (kOe) | (BH)max (MGOe) | Br (kG) | iHc (kOe) | (BH)max (MGOe) |
| 1 | — | — | 9.4 | 4.4 | 9.3 | 8.0 | 4.3 | 7.5 |
| 2 | 500 | 10 | 9.7 | 5.9 | 15.1 | 8.2 | 5.8 | 12.3 |
| 3 | 600 | 10 | 9.7 | 7.2 | 16.2 | 8.3 | 7.0 | 13.1 |
| 4 | 700 | 10 | 9.6 | 7.9 | 17.1 | 8.2 | 7.7 | 13.9 |
| 5 | 700 | 30 | 9.5 | 8.5 | 17.2 | 8.1 | 8.4 | 13.8 |
| 6 | 700 | 60 | 9.3 | 9.2 | 16.7 | 7.9 | 8.9 | 13.6 |
| 7 | 700 | 120 | 8.8 | 9.7 | 16.1 | 7.5 | 9.5 | 12.9 |
| 8 | 700 | 300 | 8.6 | 10.0 | 15.8 | 7.3 | 9.8 | 12.9 |
| 9 | 720 | 10 | 9.5 | 8.4 | 17.0 | 8.1 | 8.2 | 13.9 |
| 10 | 750 | 10 | 9.3 | 9.1 | 17.3 | 8.0 | 9.0 | 13.8 |
| 11 | 750 | 30 | 9.2 | 9.6 | 17.3 | 7.8 | 9.5 | 13.9 |
| 12 | 750 | 60 | 9.0 | 10.0 | 16.9 | 7.7 | 9.7 | 13.8 |
| 13 | 750 | 120 | 8.7 | 10.6 | 16.2 | 7.4 | 10.3 | 13.2 |
| 14 | 750 | 300 | 8.4 | 11.0 | 15.7 | 7.2 | 10.8 | 12.6 |
| 15 | 780 | 10 | 9.1 | 9.7 | 17.0 | 7.7 | 9.5 | 13.9 |
| 16 | 800 | 10 | 8.8 | 10.3 | 16.4 | 7.5 | 10.0 | 13.3 |
| 17 | 820 | 10 | 8.6 | 10.8 | 16.1 | 7.4 | 10.6 | 13.0 |
| 18 | 850 | 10 | 8.3 | 11.4 | 15.7 | 7.1 | 11.2 | 12.6 |
| 19 | 900 | 10 | 8.0 | 13.7 | 14.8 | 6.8 | 13.3 | 12.1 |

Example 18

Quenching Atmosphere (Sm8.5-Fe79.2-N12.5)

At production of the flaky powder in Example 1, Run 18, pressure of the atmosphere was changed in the range of 0.0001 Torr to 2 atm. to determine the effect thereof. The peripheral speed of the quenching roll was always 40 m/sec. Magnetic properties of magnet powders and the bonded magnets are shown in TABLE 18.

TABLE 18

| | | Quenching Atmosphere (Sm8.3—Fe79.2—N12.5) | | | | | |
|---|---|---|---|---|---|---|---|
| | | Powder | | | Magnet | | |
| No. | Pressure (Atm) | Br (kG) | iHc (kOe) | (BH)max (MGOe) | Br (kG) | iHc (kOe) | (BH)max (MGOe) |
| 1 | 2 | 9.3 | 7.4 | 15.2 | 8.4 | 7.2 | 12.3 |
| 2 | 1 | 9.4 | 8.1 | 16.8 | 8.5 | 7.9 | 13.6 |
| 3 | 0.5 | 9.6 | 8.5 | 17.5 | 8.6 | 8.4 | 14.2 |
| 4 | 0.1 | 9.6 | 8.7 | 17.6 | 8.6 | 8.5 | 14.3 |
| 5 | 0.01 | 9.7 | 8.8 | 17.9 | 8.7 | 8.5 | 14.5 |
| 6 | 0.0001 | 9.6 | 8.9 | 17.7 | 8.6 | 8.8 | 14.3 |

Example 19

Material of the Quenching Roll

At production of the flake-formed powder in Example 1, Run 18, materials of the quenching rolls were chosen from Cu, Cr—Cu alloy or Be—Cu alloy to determine the effect thereof. The peripheral speed of the quenching roll was always 40 m/sec. Magnetic properties of the magnet powders and the bonded magnets are shown in TABLE 19.

TABLE 19

| | | (Sm8.3—Fe79.2—N12.5) | | | | | |
|---|---|---|---|---|---|---|---|
| | Material | Powder | | | Magnet | | |
| No. | of Roll | Br (kG) | iHc (kOe) | (BH)max (MGOe) | Br (kG) | iHc (kOe) | (BH)max (MGOe) |
| 1 | Cu | 9.2 | 7.8 | 15.4 | 8.3 | 7.6 | 12.5 |
| 2 | Cr—Cu | 9.5 | 8.3 | 17.2 | 8.6 | 8.1 | 14.0 |
| 3 | Be—Cu | 9.6 | 8.5 | 17.5 | 9.1 | 8.4 | 14.2 |

The invention claimed is:

1. A flaky, isotropic SmFeN powdery magnet material prepared by roll-quenching a molten alloy and nitriding the alloy powder thus obtained to form a magnet alloy; the magnet alloy consisting of an alloy composition of the formula, by atomic %:

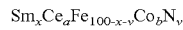

$Sm_xCe_aFe_{100-x-y}Co_bN_y$ wherein $7.1 \leq x \leq 12$ and $0.5 \leq v \leq 20$, a TbCu$_7$ crystal structure, and flakes with a thickness is 10-40 μm.
wherein
a=0.3 at. % of the alloy composition up to 30 at. % of Sm, and
b=2.0 at. % of the alloy composition up to 35 at. % of Fe, and
wherein the magnet alloy has an intrinsic coercive force (iHc) of 7 kOe higher.

2. A powdery magnet material according to claim 1, wherein the average crystal grain size of the material is 10 nm to 0.5 μm.

3. A bonded magnet made by processing the magnet powder according to claim 1 with a binder to the shape of a magnet.

4. A flaky, isotropic SmFeN powdery magnet material prepared by roll-quenching a molten alloy and nitriding the alloy powder thus obtained to form a magnet alloy; the magnet alloy consisting of an alloy composition of the formula, by atomic %:

$Sm_xCe_aFe_{100-x-z-v}Co_bM^2_zN_v$ wherein $7.1 \leq x \leq 12$, $0.5 \leq v \leq 20$ and $0.1 \leq z \leq 1.0$, a TbCu$_7$ crystal structure, and flakes with a thickness is 10-40 μm.
wherein
a=0.3 at. % of the alloy composition up to 30 at. % of Sm, and
b=2.0 at. % of the alloy composition up to 35 at. % of Fe; and
wherein M$^2$ is selected from the group consisting of Si, Nb, Ti, Ga, Al, Ta and C, and
wherein the magnet alloy has an intrinsic coercive force (iHc) of 7 kOe or higher.

5. A powdery magnet material according to claim 4, wherein the average crystal grain size of the material is 10 nm to 0.5 μm.

6. A bonded magnet made by processing the magnet powder according to claim 4 with a binder to the shape of a magnet.

7. A flaky, isotropic SmFeN powdery magnet material prepared by roll-quenching a molten alloy and nitriding the alloy powder thus obtained to form a magnet alloy; the magnet alloy consisting of an alloy composition of the formula, by atomic %:

$Sm_xCe_aFe_{100-x-v}N_v$ wherein $7.1 \leq x \leq 12$ and $0.5 \leq v \leq 20$, a TbCu$_7$ crystal structure, and flakes with a thickness is 10-40 μm,
wherein a=0.3 at. % of the alloy composition up to 30 at. % of Sm, and
wherein the magnet alloy has an intrinsic coercive force (iHc) of 7 kOe or higher.

8. A powdery magnet material according to claim 7, wherein the average crystal grain size of the material is 10 nm to 0.5 μm.

9. A bonded magnet made by processing the magnet powder according to claim 7 with a binder to the shape of a magnet.

10. A flaky, isotropic SmFeN powdery magnet material prepared by roll-quenching a molten alloy and nitriding the alloy powder thus obtained to form a magnet alloy; the magnet alloy consisting of an alloy composition of the formula, by atomic %:

$Sm_xFe_{100-x-v}Co_bN_v$ wherein $7.1 \leq x \leq 12$ and $0.5 \leq v \leq 20$, a TbCu$_7$ crystal structure, and flakes with a thickness is 10-40 μm.
wherein b=2.0 at. % of the alloy composition up to 35 at. % of Fe, and
wherein the magnet alloy has an intrinsic coercive force (iHc) of 7 kOe or higher.

11. A powdery magnet material according to claim 10, wherein the average crystal grain size of the material is 10 nm to 0.5 μm.

12. A bonded magnet made by processing the magnet powder according to claim 10 with a binder to the shape of a magnet.

13. A flaky, isotropic SmFeN powdery magnet material prepared by roll-quenching a molten alloy and nitriding the alloy powder thus obtained to form a magnet alloy; the magnet alloy consisting of an alloy composition of the formula, by atomic %:

$Sm_xCe_aFe_{100-x-z-v}M^2_zN_v$ wherein $7.1 \leq x \leq 12$, $0.5 \leq v \leq 20$ and $0.1 \leq z \leq 1.0$, a TbCu$_7$ crystal structure, and flakes with a thickness is 10-40 μm,
wherein a=0.3 at. % of the alloy composition up to 30 at. % of Sm, and
wherein M$^2$ is selected from the group consisting of Si, Nb, Ti, Ga, Al, Ta and C, and
wherein the magnet alloy has an intrinsic coercive force (iHc) of 7 kOe or higher.

14. A powdery magnet material according to claim 13, wherein the average crystal grain size of the material is 10 nm to 0.5 μm.

15. A bonded magnet made by processing the magnet powder according to claim 13 with a binder to the shape of a magnet.

16. A flaky, isotropic SmFeN powdery magnet material prepared by roll-quenching a molten alloy and nitriding the alloy powder thus obtained to form a magnet alloy; the magnet alloy consisting of an alloy composition of the formula, by atomic %:

$Sm_xFe_{100-x-z-v}Co_bM^2_zN_v$ wherein $7.1 \leq x \leq 12$, $0.5 \leq v \leq 20$ and $0.1 \leq z \leq 1.0$, a TbCu$_7$ crystal structure, and flakes with a thickness is 10-40 μm,
wherein b=2.0 at. % of the alloy composition up to 30 at. % of Fe,
wherein M2 is selected from the group consisting of Si, Nb, Ti, Ga, Al, Ta and C, and
wherein the magnet alloy has an intrinsic coercive force (iHc) of 7 kOe or higher.

17. A powdery magnet material according to claim 16, wherein the average crystal grain size of the material 10 nm to 0.5 μm.

18. A bonded magnet made by processing the magnet powder according to claim 16 with a binder to the shape of a magnet.

* * * * *